Figure 1:
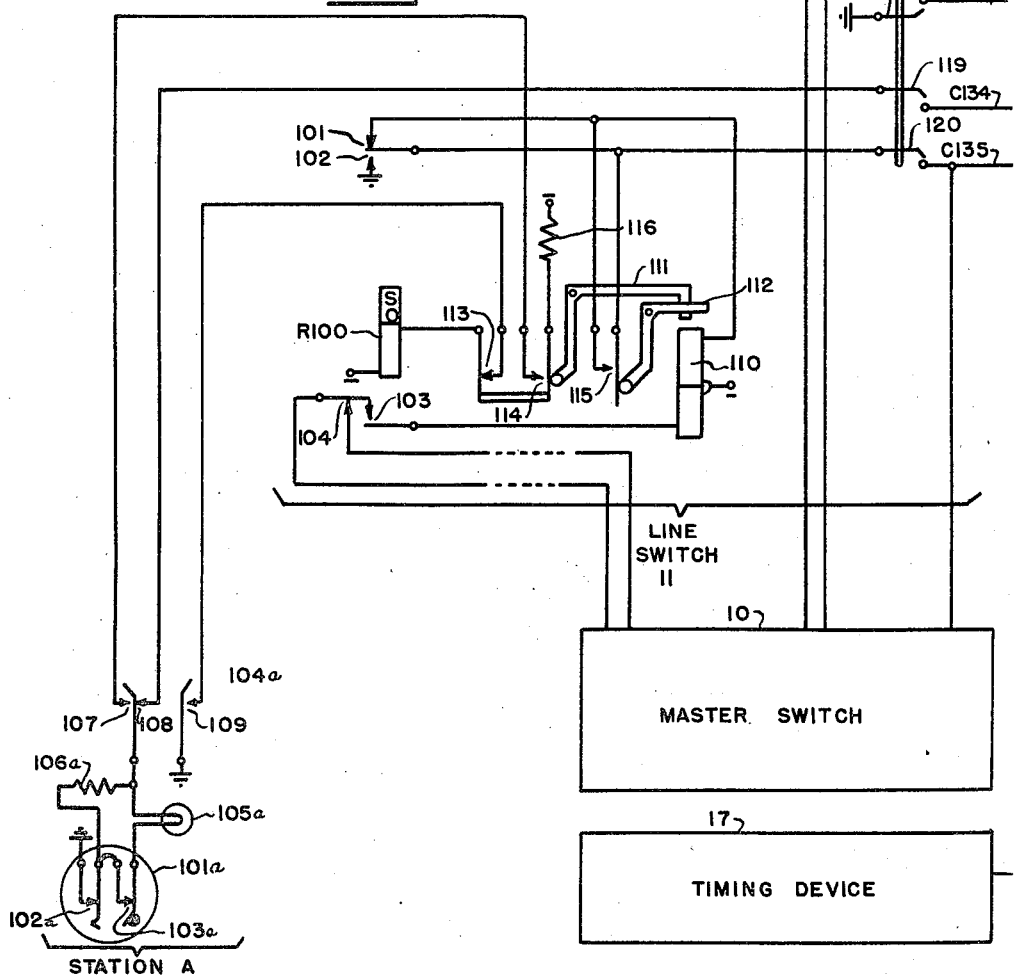
Figure 2:
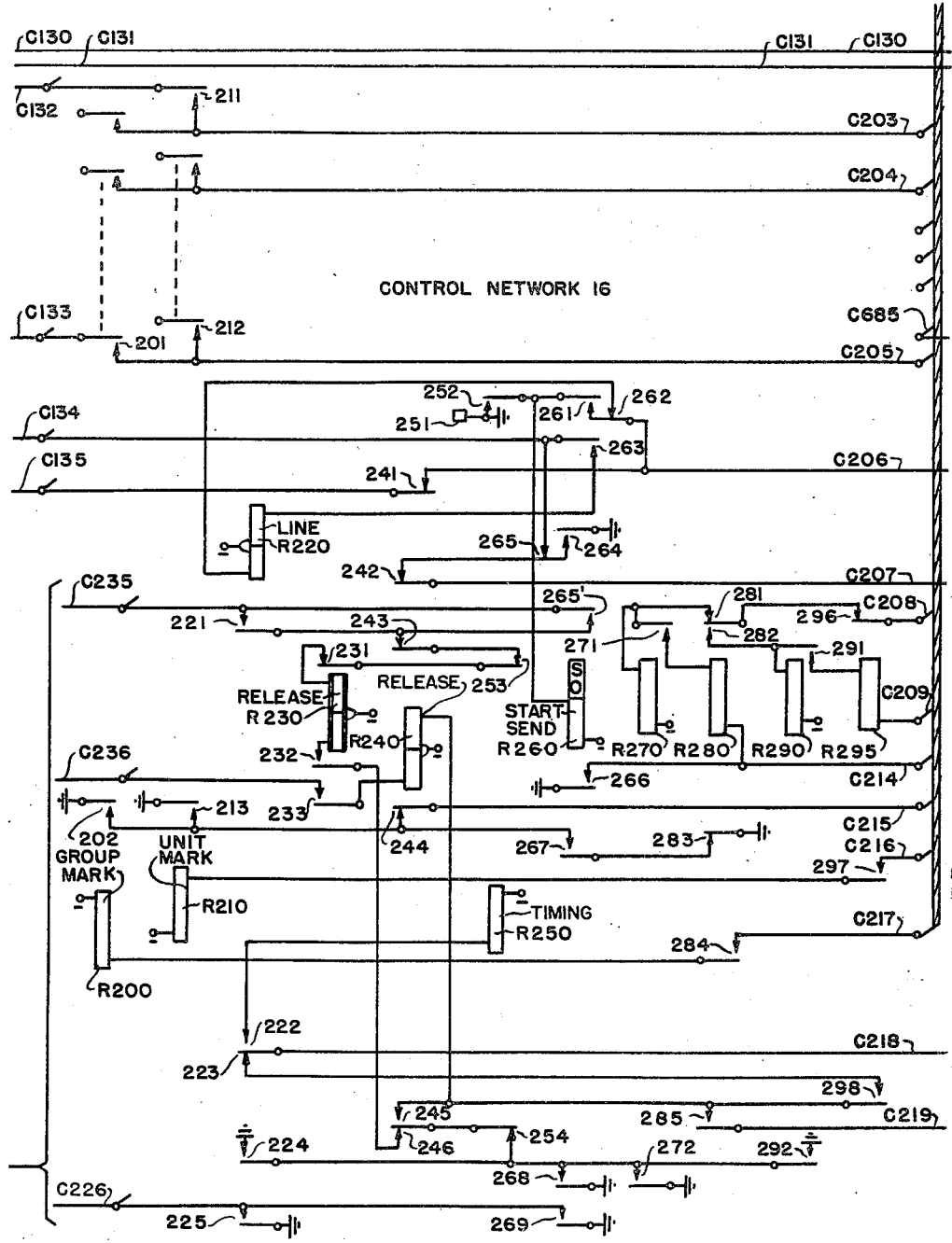

Sept. 28, 1943.  V. A. JOHNSON  2,330,358
INDICATING SYSTEM
Filed May 1, 1941  7 Sheets-Sheet 1

Sept. 28, 1943.  V. A. JOHNSON  2,330,358
INDICATING SYSTEM
Filed May 1, 1941  7 Sheets-Sheet 6

Fig. 6

INVENTOR.
VINCENT A. JOHNSON
BY *Davis, Lindsey, Smith & Shorts*
ATTORNEYS

Patented Sept. 28, 1943

2,330,358

UNITED STATES PATENT OFFICE 2,330,358

INDICATING SYSTEM

Vincent A. Johnson, Evanston, Ill., assignor to Automatic Electric Laboratories, Inc., a corporation of Delaware Application May 1, 1941, Serial No. 391,275

14 Claims. (Cl. 177—353)

The present invention relates to systems for indicating the location of one or more persons or objects which may be located in different zones of a plural zone area, and more particularly to improvements in systems for providing accurate information as to the whereabouts of a large number of doctors who may be working on the different floors of a large hospital. An improved system of this character is disclosed and claimed in the co-pending application Serial No. 390,557, filed April 26, 1941, Thomas H. Mote, which is assigned to the same assignee as the present invention, and the present invention relates to improvements thereover. In the system disclosed in the Mote application, a display board is provided on each floor of the hospital and each board includes signal controlled indicators arranged in sets which are individual to the various doctors. These indicators are selectively controllable through automatic switching equipment from control stations conveniently located on the floors of the hospital, and function to indicate the floors where the respective corresponding doctors may be located. The indicators are of the pulse-controlled type, each thereof including an indicator drum which may be driven from any off-normal position to its blank position when a train of ten restoring pulses is transmitted to the associated operating magnet, and may be advanced from the blank position to any desired off-normal or display position when a predetermined train of reset pulses is transmitted to the associated operating magnet. In the Mote system, selector and connector switches are utilized in selecting the indicators individual to any doctor. These switches are controlled through the operation of the dial-operated impulse senders provided at the control stations of the system. Only the selection of the sets of indicators individual to the desired doctors is accomplished through operation of the impulse sending devices, the transmission of the restoring and reset pulse trains to the selected indicators being accomplished through the operation of automatic signal or pulse senders individual to the various zones or floors of the hospital. Although the system is simple in arrangement, fully satisfactory in operation, and includes several improved and novel operating features, it requires an automatic signal or pulse sender for each zone or floor of the hospital in which a control station is located.

It is an object of the present invention, therefore, to provide an improved system of the character described which is simple in arrangement, is easy to control, has a large posting capacity, and requires a minimum of automatic signal senders.

According to another object of the invention the system is arranged in an improved manner such that the number of automatic signal senders required, is substantially less than the number of zones from which the display boards may be controlled.

It is a further object of the invention to provide an improved system of the character described, which includes provisions whereby any person instituting a change in the setting of certain selected indicators, is automatically informed as to the progress of the control connection which is set up to effect the desired indicator change.

It is still another object of the invention to provide in a system of the character described, facilities whereby a delay interval, separating the selection of a set of indicators from the resetting of the selected indicators, is introduced in the operation of the apparatus in order that the user of the system may release the control connection through which the indicators are selected without disturbing the setting of the selected indicators in the event it is discovered that the wrong set of indicators has been selected.

It is still another object of the invention to provide an improved system of the character described which includes provisions for automatically releasing any automatic switching equipment which is held from any of the control stations of the system for an unreasonable time interval.

In the illustrated embodiment of the invention the set of indicators individual to each doctor may be selected from any one of the control stations by dialing "in" and "out" identification numbers which are individually assigned to the doctors. The dialing of these numbers serves to position the directively controlled selector and connector switches so that a control connection is set up to the desired set of indicators. The automatic signal senders, provided for transmitting the restoring and reset pulse trains to selected ones of the indicators, are individual to the selector switches, and each thereof is operatively associated with a selected set of indicators when a control connection is set up through the associated selector switch and one of the connector switches to the selected indicators. Incident to the completion of this control connection, the operation of the seized signal sender is initiated to transmit to the selected indicators a train of restoring pulses followed by two trains of reset pulses which indicate by the numerical values thereof the zone or floor from which the selected indicators are being controlled. In order that the trains of reset pulses may accurately indicate the zone of the calling control station, group and unit marking paths individual to the various control stations are set up to each sender when the sender is seized. These paths serve to determine the number of pulses of each of the two reset pulse trains in accordance with the zone of the calling control station.

In accordance with another feature of the present invention, each control station is equipped with signaling means in the form of a pilot lamp, and provisions are made in the system for automatically controlling this lamp to produce different signal indications as a control connection is progressively extended through different ones of the automatic switching stages to a desired set of indicators. More specifically, this lamp, as provided at each station, is controlled to indicate an all-switch-busy condition at any switching stage, and to provide an indication as to when the dialing operation may be started and when the desired set of indicators has been selected.

In accordance with another feature of the invention, two sets of timing equipment are incorporated in the system, which have distinctly different functions, although the operations thereof are correlated. More specifically, each selector switch is equipped with apparatus which responds to the operation of one set of timing equipment by automatically releasing the selector switch in the event a control connection, as routed to the switch from one of the control stations, is not extended through the switch to a desired set of indicators within a predetermined time interval. The timing devices of the other type are individual to the various selector switches and each thereof functions to delay the operation of an associated signal sender for a measured time interval which starts with the selection of the desired set of indicators.

The novel features believed to be characteristic of the invention are set forth with particularity in the appended claims. The invention, both as to its organization and method of operation, together with further objects and advantages thereof, will best be understood by reference to the specification taken in connection with the accompanying drawings in which Figs. 1, 2, 3, 4, 5, 6 and 7, when combined in the manner shown in Fig. 8, illustrate a portion of the equipment provided in a system which includes the features of the invention briefly outlined above.

Referring now more particularly to the drawings, the system there illustrated comprises a plurality of display boards which are individual to the various floors of the hospital and each of which is conveniently located for easy observation from any point in the corridor of the floor on which it is located. One such display board is indicated at 25 as being provided on the first floor of the hospital. This display board comprises a plurality of display units 26, 27, 28, 29, 30, etc. which individually correspond to the doctors whose locations are to be posted on the board. For example, the display unit 26 may be utilized to indicate the location of the doctor who is assigned the "in" identification number 247 and the "out" identification number 147, and the display unit 27 may be utilized to indicate the location of the doctor who is assigned the "in" identification number 257 and the "out" identification number 157. The various display boards are of identical arrangement and, as will appear more fully hereinafter, are so arranged that the corresponding indicators of each display unit or indicator set are controlled in unison. The individual display units of the display boards are also identical in arrangement, the illustrated unit 26 comprising a pair of floor indicating display registers or indicators 500a and 500b. These registers are of the well-known electromechanical type and each thereof is provided with a display drum which may be rotated from a normal or blank position to any one of ten off-normal positions wherein the numerals one to nine and zero are respectively displayed thereby. If desired these registers may be of the form disclosed in Fig. 22 of Patent No. 2,234,684, granted March 11, 1941, to Harold C. Robinson and Martin L. Nelson. More specifically, the register 500a is provided to display the tens digit of any floor number from ten to ninety-nine, and the register 500b is provided to display the units digit of such floor numbers. The indicating drum of each display register 500 is mounted on a drive shaft, to which rotary movement is imparted in one direction only by an associated signal-controlled operating magnet 501 through an associated ratchet and pawl or Geneva gear mechanism, not shown. The drive shaft of each indicator also carries a cam 504 which is arranged to control two associated sets of commutating contacts 502 and 503, in the manner more fully explained hereinafter.

The control of the various display boards is effected from control stations which are conveniently located in each zone or on each floor of the hospital. Thus the nineteenth floor of the building is provided with a control station A, which includes a signal transmitting device 101a, a combined call and release key 104a, and a pilot lamp 105a. The connect key 104a is of the well-known non-locking type, and is provided with a call position and a release position in addition to its normal position. The signal transmitting device 101a is of the well-known dial-operated type conventionally used in substations of automatic telephone systems. More specifically, this signal transmitting device includes a set of pulsing springs 102a and a set of off-normal springs 103a.

The selection and selective control of the indicators included in the various display units of the display boards are effected through the provision of automatic switching equipment, the major portion of which is common to all of the control stations in the hospital. More specifically, this equipment includes line switches individual to the various floors of the hospital and having access to a group of selector switches, which selector switches, in turn, have access to five groups of connector switches through which the various display units may selectively be seized for control purposes. In the drawings only a single line switch 11, individual to the control station on the nineteenth floor, a single selector switch 12, and a single connector switch 13 are illustrated. Each connector switch of each group has access to the display units individual to one hundred doctors and, since five groups of connector switches are provided, the total posting capacity of the illustrated system is five hundred doctors. It will be understood, however, that by providing additional switching stages the capacity of the system may be expanded as desired. For example, if second selector switches are interposed between the first selector switches and the connector switches, and additional groups of connector switches are provided, the system capacity may be increased to five thousand doctors.

The various line switches individual to the several floors are of the well-known plunger type, a master switch 10 of conventional arrangement being provided for controlling the operating plungers of these switches so that they are always positioned opposite a set of contacts terminating a trunk extending to an idle first selector. Briefly described, the line switch 11 includes a bank of contacts, the individual contacts of which are arranged in horizontal rows. The vertically aligned contacts of the various rows constitute contact sets at which the conductors of the trunks extending to the various first selectors are terminated. In the illustrated arrangement, each contact set includes four pairs of contact springs. For the purpose of actuating the operating plunger of the switch to actuate the contacts of a selected set into engagement, the usual operating assembly is provided which includes a bridge cut-off armature 111, a plunger armature 112, and a double-wound operating magnet 110. The switch also includes a line relay R100 which, in accordance with conventional practice, is of the slow-to-operate type.

As indicated above, the switch plunger is automatically maintained in a position opposite a set of contacts terminating the conductors of a trunk extending to an idle selector, through operation of the master switch 10 in a manner well understood in the art. More specifically, this master switch operates to search for an idle selector switch each time a previously selected selector switch is seized through one of the line switches. Incident to the searching operation, the plunger operating sector of the master switch is so operated that, as each trunk is tested, the line switch plungers are positioned opposite the contacts terminating the conductors of the tested trunk. Accordingly, when an idle trunk is found to arrest the searching operation of the master switch, the plungers of the various line switches are positioned opposite the contacts terminating the conductors of the selected idle trunk. For the purpose of preventing useless searching on the part of the master switch 10, at a time when all of the selector switches are in use, busy relays R370, R372, R374, R376, R378, etc. individual to the various selector switches, are provided. These relays are arranged to control a chain circuit which, when completed, serves to energize an all-switch-busy relay in the master switch 10. The latter relay, in operating, functions to prevent the continued operation of the master switch equipment.

Figure 3:
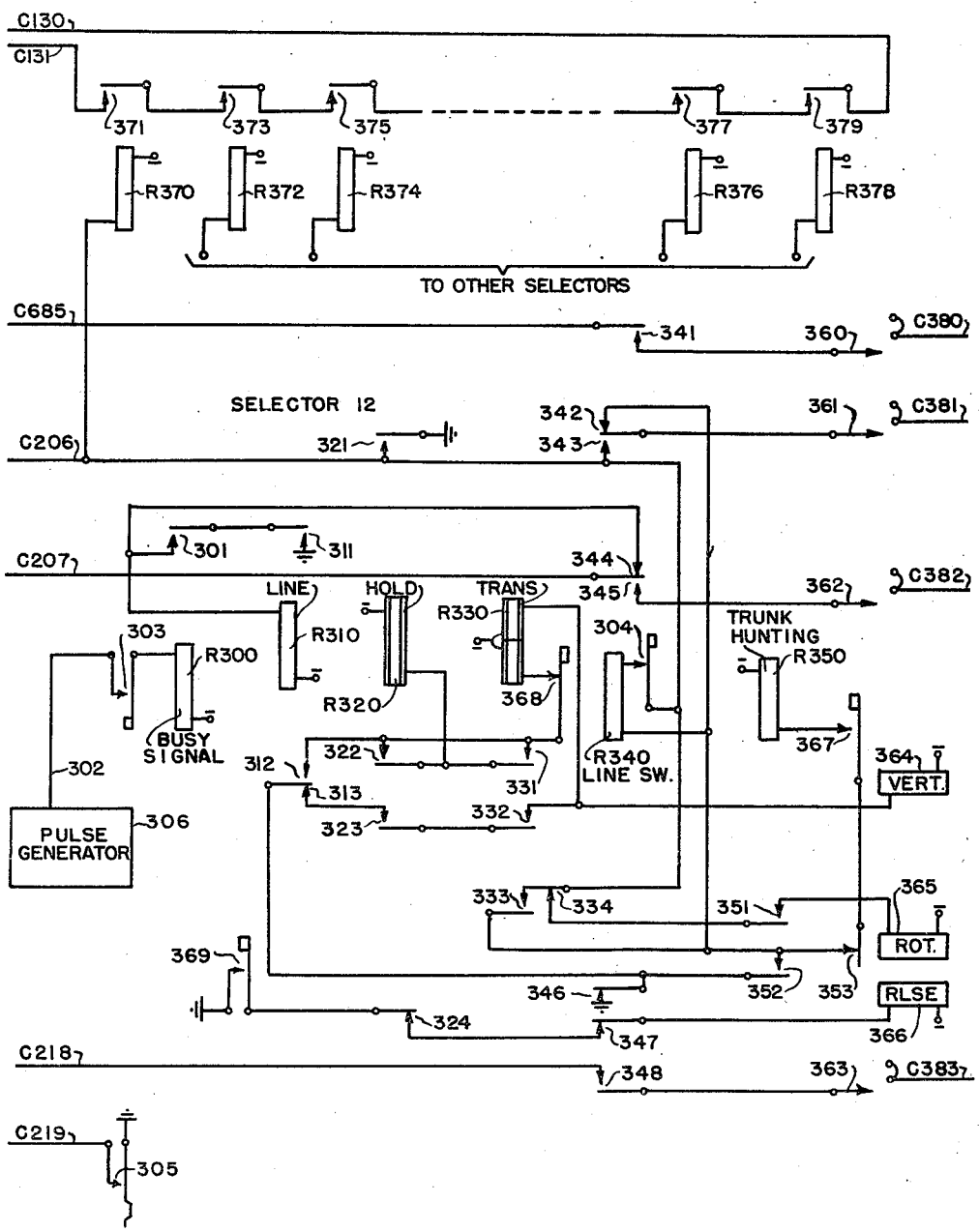
Figure 4:
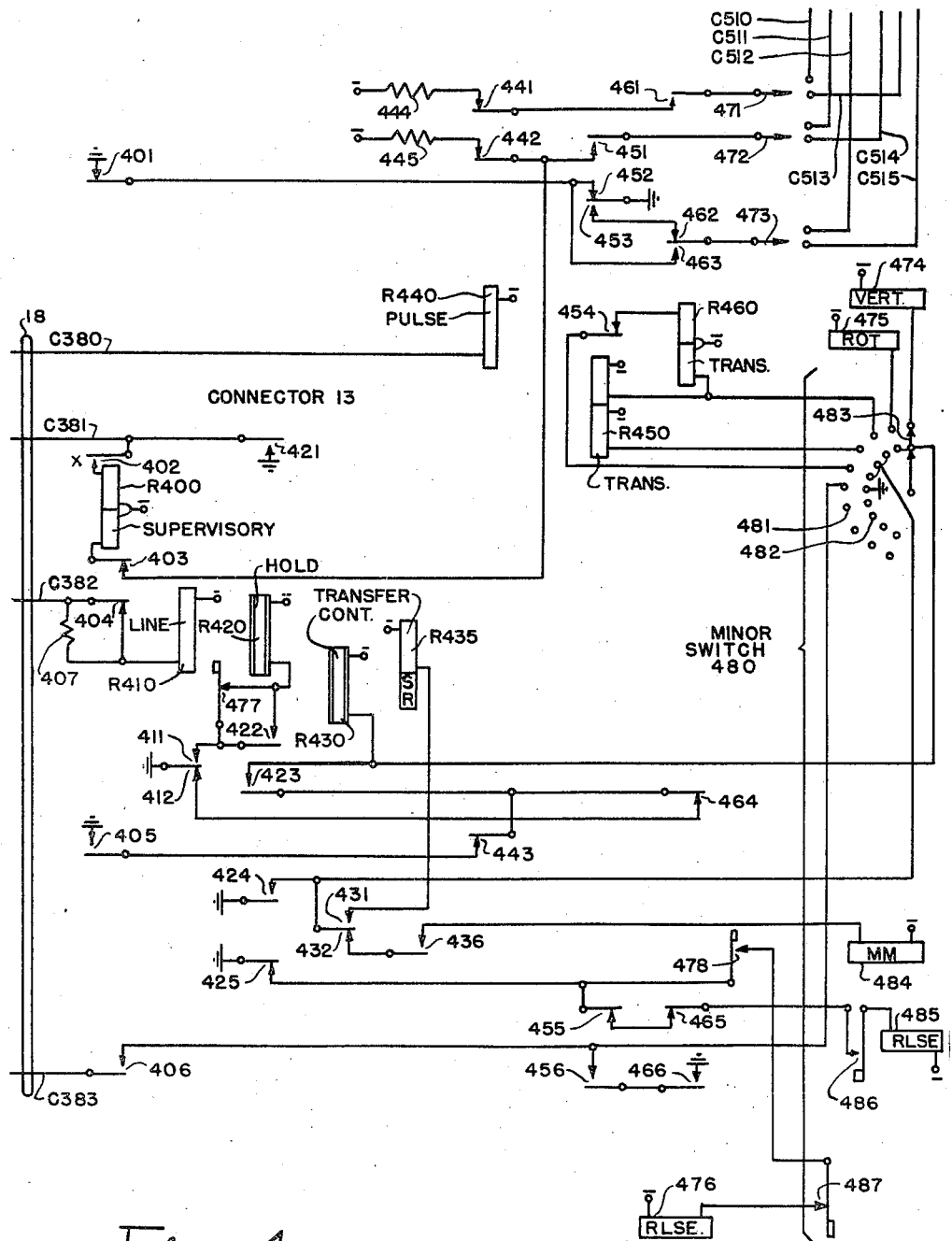
Figure 5:
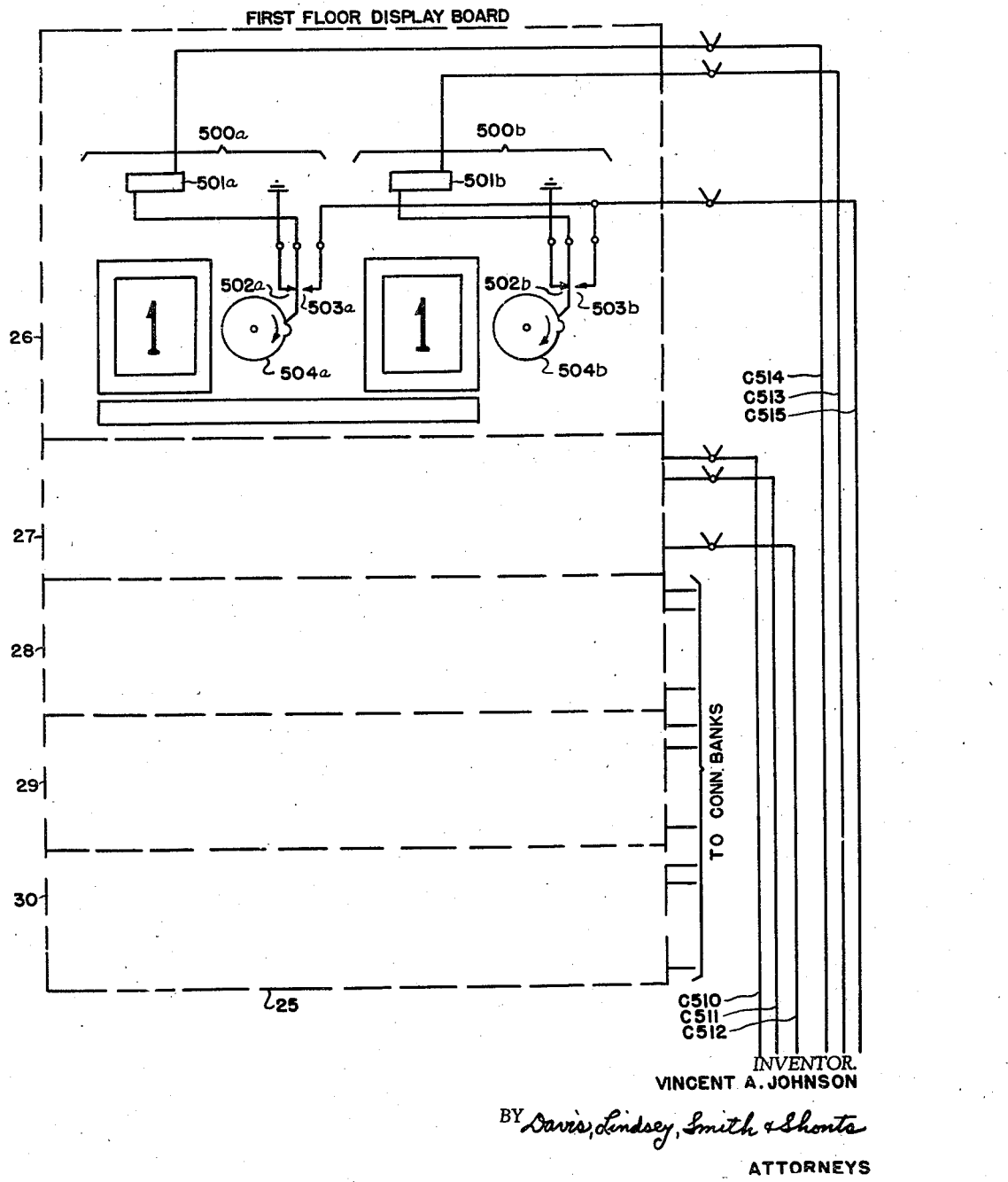

Each of the selector and connector switches of the system includes a two-motion switching mechanism of the well-known Strowger type. Each switching mechanism is equipped with a plurality of banks of contacts each including one hundred contact points. The contacts making up each contact field are divided into ten levels of ten contact sets each, and each of the banks has associated therewith a wiper which is carried by an associated wiper carriage structure of well-known construction and arrangement. Thus the selector switch 12 is illustrated in Fig. 3 of the drawings as comprising a contact field divided into four banks having the wipers 360, 361, 362 and 363 individually associated therewith. The trunks extending to the connector switches accessible to the selector switch 12 are each terminated at two sets of contacts in adjacent levels of the selector switch. Thus the trunk 18 extending to the connector switch 13 is multipled to the corresponding contact sets of the first and second levels of the contact field embodied in the selector switch 12. The purpose of this arrangement is to permit any doctor selectively to wipe out indications displayed by the indicators provided for his use, or to reset these indicators to display new indications, by dialing either of his two identification numbers at any one of the control stations. The manner in which this is accomplished is more fully considered in the following detailed description of the operation of the system. For the purpose of elevating the enumerated wipers of the selector switch 12 to a position opposite a desired level of bank contacts, and then rotating the same into engagement with a selected set of contacts of the selected level, vertical and rotary magnets 364 and 365 are included in the switching mechanism. The mechanism further comprises a release magnet 366 which, when energized, permits the wiper carriage structure to be returned to rotary and vertical normal; three sets of off-normal springs 367, 368 and 369 which are operated when the wiper carriage structure is moved to any vertical off-normal position; cam springs 303 which are operated into engagement when the enumerated wipers are rotated eleven steps from the rotary normal position thereof; and normal post springs 305 which are normally disengaged and are moved into engagement when the wipers 360 to 363, inclusive, are elevated to a position opposite any odd-numbered level of bank contacts. The operation of the magnets 364, 365 and 366 is controlled by a set of control relays which includes a busy signal relay R300, a line relay R310, a hold relay R320, a transfer relay R330, a line switching relay R340, and a trunk hunting relay R350. It will be recognized that the two relays R320 and R330 are of the well-known slow-acting type.

The Strowger switching mechanism incorporated in the connector switch 13 includes three wipers 471, 472 and 473, individual to the three banks of the associated contact field, a vertical magnet 474, a rotary magnet 475, a release magnet 476, and two sets of vertical off-normal springs 477 and 478. The control equipment of this connector switch includes a minor switch 480 and a relay network which comprises a supervisory relay R400, a line relay R410, a slow-acting hold relay R420, a slow-acting transfer control relay R430, a slow-to-release transfer control relay R435, a pulsing relay R440, and a pair of pulse circuit transfer relays R450 and R460. The minor switch 480 is of well-known construction and arrangement and includes inner and outer contact rows 481 and 482 which are arranged to be bridged by a wiper 483. An operating magnet 484 is incorporated in the switch for actuating the wiper 483 step by step over the contacts of the two contact rows 481 and 482. For the purpose of restoring this wiper to its illustrated normal position, a release magnet 485 is provided. The minor switch further includes two sets of off-normal springs 486 and 487 which function to perform control operations fully described hereinafter.

Figure 7:
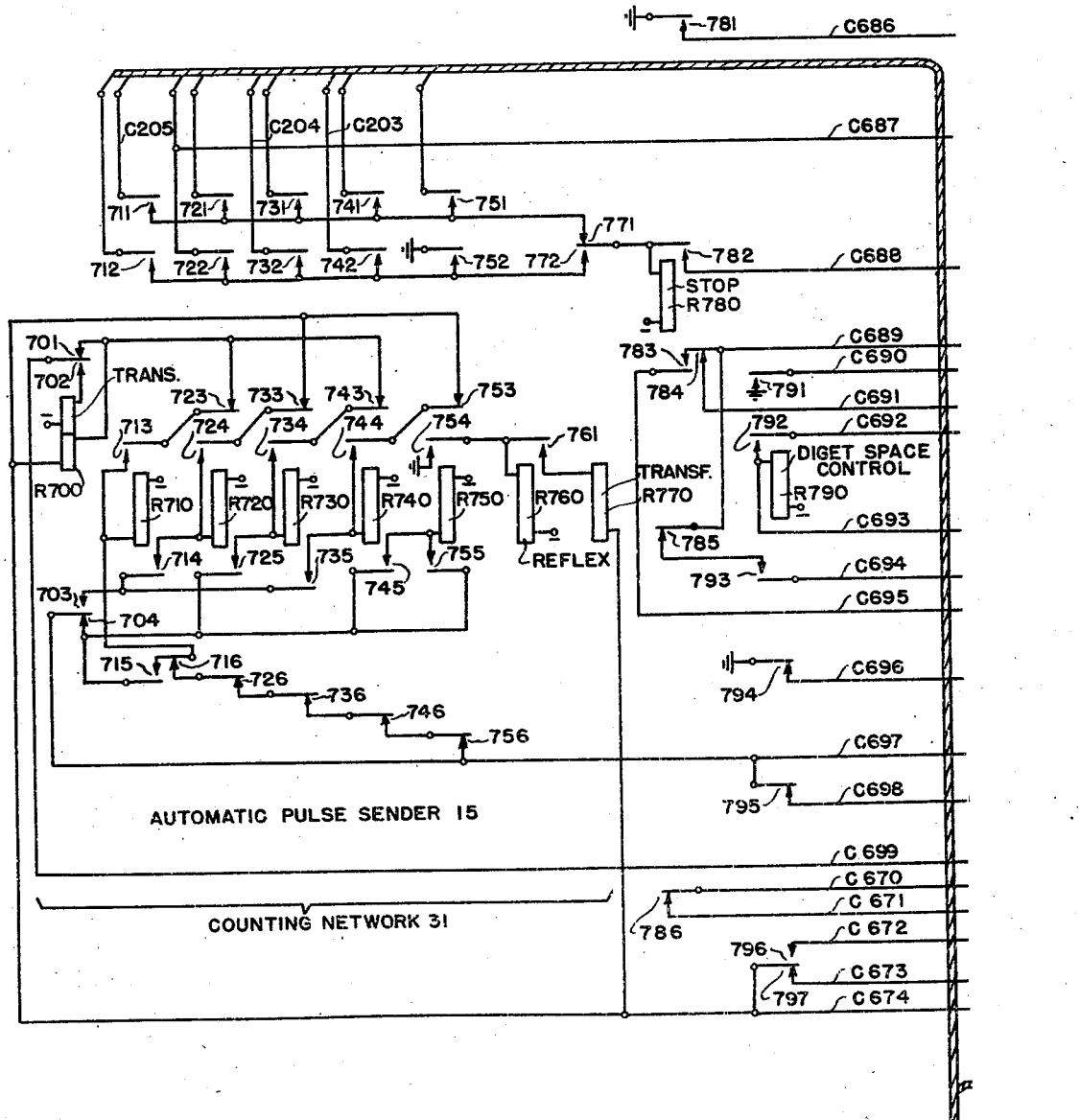

As indicated by the above description, the selector and connector switches of the system are directively controlled through operation of the signal transmitting devices provided at the various control stations to select the indicators individual to the various doctors. The actual control of the selected indicators to effect a change in the indications displayed thereby is effected through the operation of automatic plural digit signal senders which are individual to the various selector switches. One such signal sender 15 is illustrated in Figs. 6 and 7 of the drawings as being associated with the selector switch 12. Briefly described, this sender comprises a pulse counting network 31, a set of pulse generating relays R615, R620 and R630, and a plurality of auxiliary control relays. The counting network 31 includes a pulse circuit transfer relay R700, five counting relays R710, R720, R730, R740 and R750, a reflexing relay R760 and a transfer relay R770. The auxiliary relay equipment of the sender includes a stop relay R780, a pair of digits spacing control relays R790 and R600, a pulse circuit control relay R610, a transfer relay R640, a sender start relay R650, a start sending relay R660 and a slow-acting hold relay R680.

For the purpose of initiating the operation of the pulse sender 15, and of controlling the operation of this sender in accordance with the floor number of the control station from which the selector switch 12 is seized, a control network 16 is provided which is individual to the sender 15 and the selector switch 12. Similar networks are provided in association with the other selector switches of the system. In this regard, it is noted that the pulse sender 15 is common to all of the control stations of the system. Accordingly, provisions must be made for controlling the reset pulse transmission in accordance with the number identifying the floor from which the selector switch 12 and the sender 15 are seized. For example, if a selected set of indicators is to be reset from the control station A located on the nineteenth floor of the hospital, the signal transmitted from the signal sender in use, must comprise a first signal digit of one impulse and a second signal digit of nine impulses, in order that the proper indication will be set up by the selected indicator. To this end, group and unit marking paths are provided which extend from the banks of the various line switches through contacts controlled by the relays of the control network 16 and the relays of the counting network 31 to the stop relay R780. Similar marking paths, also controlled by the relays of the networks 16, 31, etc., extend to the bank contacts of each of the other line switches of the system. These group and unit marking paths serve to determine the numerical values of the digits transmitted by the sender 15 and the other senders, in the manner more fully explained hereinafter.

Briefly described, the control network 16 comprises a group marking relay R200, a unit marking relay R210, a line relay R220, a slow-acting release relay R230, a second release relay R240, a timing relay R250, a start sending relay R260 and four digit transfer relays R270, R280, R290 and R295. For the purpose of controlling the release relay R230 of the network 16 and the corresponding relays of the other similar control networks, a timing device 17 of conventional arrangement is provided.

Current for energizing the indicator operating magnets, the control relays, the pilot lamps, the operating magnets of the various minor switches, and the operating magnets of the Strowger switching mechanisms, is supplied from a common direct current source, the positive terminal of which is connected to a common bus conductor and to ground. The negative terminal of the source is connected to a common negative bus conductor which terminates the various relay, magnet and lamp terminals identified in the drawings by the negative polarity sign. For convenience in describing the circuits involved, this source of current, which may conventionally comprise a storage battery floated across the terminals of a charging rectifier, has not been shown.

In considering the operation of the system, it may first be assumed that the doctor who is assigned the "in" identification number 247 enters the hospital and proceeds to the nineteenth floor, where he will be occupied for a considerable period of time. If this doctor desires to place himself on call, he may do so by actuating the transmitting device provided at the control station A on the nineteenth floor to transmit the three digits of his "in" identification number to the automatic switching equipment. Before starting the dialing operation, the doctor actuates the key 104a to its call position, thereby to move the contacts 109 into engagement. At these contacts, a circuit including the contacts 113 is completed for energizing the line relay R100 of the line switch 11. When energized in this circuit the relay R100 operates after an interval, and closes its contacts 102 to connect the contact spring 120 to ground. At its contacts 101, the relay R100 opens a point in one of the circuits for energizing the upper or BCO winding of the magnet 110. At its contacts 104, the relay R100 opens a point in the "in-out" chain circuit over which the PDC windings of the operating magnets in the various line switches may be energized under the control of the master switch 10. At its contacts 103, the relay R100 prepares a circuit for energizing the PDC winding of the magnet 110. A short time interval after the last-mentioned circuit is prepared, the delay relay of the master switch 10 functions to complete the circuit. When thus energized, the magnet 110 actuates its armatures 111 and 112 to pull the associated plunger into the contact bank. Assuming that the selector switch 12 is the switch previously selected by the master switch 10, the plunger of the line switch causes the contact springs 117 to 120, inclusive, to be moved into engagement with the contact springs terminating the conductors of the trunk extending to this selector switch. When the contact spring 120 is moved to engage the contact terminating the conductor C135, a circuit is completed for energizing the line relay R220, this circuit extending from ground by way of the contacts 102, the contact spring 120, C135, the contacts 241 and 262, and the lower winding of R220 to battery. In operating, the relay R220 closes its contacts 221 to prepare the operating circuit for the release relay R230. At its contacts 222, the relay R220 prepares the operating circuit for the timing relay R250. At its contacts 223, the relay R220 opens a point in the operating circuit for the release relay R240. At its contacts 224, the relay R220 prepares locking circuits for the two relays R230 and R240. At its contacts 225, the relay R220 completes an obvious path for impressing ground potential upon the timer start lead C226, whereby operation of the timing device 17 is initiated in the event this device is not already in operation.

In operating, the line armature 112 of the line switch 11 closes its associated contacts 115 to complete a circuit for energizing the BCO winding of the magnet 110, this circuit extending from ground by way of the contacts 102 and 115 and the upper or BCO winding of the magnet 110 to battery. The energization of this winding serves to retain the operated armatures 111 and 112 in their attracted positions after the PDC or lower winding of the magnet 110 is deenergized, in the manner explained below. At the contacts 115, a path including the contacts 102 and the contact spring 120 is also completed for impressing ground potential upon the test conductor C135 of the trunk extending to the selector switch 12, whereby this selector switch is marked as busy in the master switch 10. In attracting its BCO armature 111, the magnet 110 closes the contacts 114 to prepare a circuit for energizing the pilot lamp 105a. In attracting its BCO armature 111, the magnet 110 also opens its contacts 113 to deenergize the line relay R100.

When the line switch 11 is operated to seize the selector switch 12 in the manner just explained, a circuit is completed for energizing the pilot lamp 105a in series with the line relay R310 of the selector 12. This circuit extends from ground by way of the pulsing springs 102a, the shunt springs 103a, the resistor 106a and the lamp 105a in parallel, the contact springs 108, the contact spring 119, C134, the contacts 265 and 242, C207, the contacts 344 and the winding of R310 to battery. When energized in this circuit, the pilot lamp 105a is illuminated and the relay R310 operates. The illumination of the lamp 105a serves to inform the calling doctor that the key 104a may be released. Incident to the release of this key, the contacts 109 are disengaged to open another point in the operating circuit for the line relay R100.

The relay R310, in operating, closes its contacts 311 to prepare a path for excluding its own winding from the circuit for energizing the pilot lamp 105a. At its contacts 312, the relay R310 completes a circuit including the contacts 346 and the off-normal springs 368 for energizing the lower winding of the transfer relay R330. At its contacts 313, the relay R310 opens a point in the circuit for energizing the vertical magnet 364 and the upper winding of the relay R330 in parallel. The relay R330, in operating, closes its contacts 332 to prepare the last-mentioned circuit. At its contacts 333, the relay R330 prepares the operating circuit for the trunk hunting relay R350. At its contacts 334, the relay R330 opens a point in the operating circuit for the rotary magnet 365. At its contacts 331, the relay R330 completes the prepared operating circuit for the hold relay R320, this circuit extending to ground over a path including the contacts 312 and 346.

The relay R320, upon operating, locks to ground over a path including the contacts 322, 312 and 346. At its contacts 323, the relay R320 further prepares the circuit for energizing the vertical magnet 364 in parallel with the upper winding of the transfer relay R330. At its contacts 324, the relay R320 opens a point in the operating circuit for the release magnet 366. At its contacts 321, the relay R320 completes an alternative path for impressing ground potential upon the test conductor C135 and, in so doing, closes a locking circuit for the BCO winding of the magnet 110. This circuit extends from ground by way of the contacts 321, C206, the contacts 241, the test conductor C135, the contact spring 120, the contacts 115, and the upper or BCO winding of the magnet 110 to battery. The continued energization of this winding serves to maintain the line switch 11 in its operated position. Following the operations just described the selector 12 is conditioned to respond to the first digit "2" of the calling doctor's "in" identification number.

Shortly after the hold relay R320 operates to complete the above-traced locking circuit for the BCO winding of the magnet 110, the line relay R100 restores. In releasing, this relay opens its contacts 102 to interrupt the initially traced circuit for energizing the BCO winding of the magnet 110. At its contacts 101, the relay R100 closes an obvious shunt across the contacts 115. At its contacts 103, the relay R100 interrupts the above-described circuit for energizing the PDC winding of the magnet 110. At its contacts 104, the relay R100 recompletes the "in-out" chain circuit which is common to the line switches and is controlled by the master switch 10.

When the test conductor C135 individual to the selector switch 12 is connected to ground to render this selector switch busy, in the manner explained above, the master switch 10 operates in a well-known manner to line up the plungers of all idle line switches controlled by the master switch 10 with the contacts which terminate the trunk conductors extending to the next available free trunk. Thus another of the selector switches is preselected by the master switch 10 for use in handling the next initiated call. In the event all of the other selector switches accessible to the line switches are busy at the time the selector switch 12 is taken for use, in the manner just explained, all of the relays R370, R372, R374, R376, R378, etc. are operated so that the previously mentioned chain circuit is completed for energizing the all-busy relay of the master switch 10. This circuit includes the two conductors C130 and C131 and the chain-connected make contacts 371, 373, 375, 377, 379, etc. of the relays individual to the various selector switches. When this circuit is completed the all-busy relay of the master switch 10 operates to prevent useless searching of the master switch for an idle selector switch. It will be understood from this explanation that when one of the selector switches thereafter becomes idle, the associated one of the relays R370, R372, R374, etc. is deenergized and restores to open the chain operating circuit for the all-busy relay of the master switch. This relay, in restoring, permits the master switch to search for the selector switch which has been released. Upon locating this selector switch the plungers of the idle line switches are all positioned opposite the contacts terminating the conductors of the trunk extending to the idle selector switch.

When the first digit "2" is dialed at the station A the off-normal springs 103a of the signal transmitting device 101a are opened to deenergize the lamp 105a for the duration of the dialing operation, and the pulsing springs 102a are opened and closed twice to transmit two impulses over the above-traced circuit for energizing the line relay R310. In this regard, it will be noted that the current pulses are transmitted solely through the resistor 106a. The relay R310, upon restoring at the beginning of the open-circuit period of the first impulse, opens its contacts 312 to interrupt the operating and locking circuits for the two relays R320 and R330. At its contacts 313, the relay R310 completes the prepared circuit for energizing the vertical magnet 364 in parallel with the upper winding of the transfer relay R330. This circuit extends from ground by way of the contacts 346, 313, 323 and 332, and the parallel-connected windings of the relay R330 and the vertical magnet 364 to battery. When energized over this circuit, the vertical magnet 364, operating in conjunction with its associated ratchet and pawl mechanism, functions to move the wipers 360 to 363, inclusive, one step in the vertical direction, wherein they are positioned opposite the first level of contacts in the associated contact field. When the wipers of the selector switch 12 are thus elevated to a position opposite an odd-numbered level of bank contacts, the normal post springs 305 are moved into engagement to prepare a circuit for energizing the release relay R240. Incident to the vertical movement of the wiper carriage structure, the vertical off-normal springs 367 are moved into engagement to complete the operating circuit for the trunk hunting relay R350; the vertical off-normal springs 369 are engaged to prepare the operating circuit for the release magnet 366; and the vertical off-normal springs 368 are disengaged to deenergize the lower winding of the transfer relay R330. The purpose of energizing the upper winding of this transfer relay in parallel with the winding of the vertical magnet 364, during the dialing of the first digit, now becomes apparent. Thus this parallel circuit provides a vehicle whereby the transfer relay R330 is intermittently energized and thereby maintained in its operated position throughout the series of impulses transmitted to the selector switch 12. Due to the slow-to-release characteristics thereof, the relays R320 and R330 remain operated during the operation of the line relay R310 to repeat the dialed impulses to the vertical magnet 364. The circuit for energizing the trunk hunting relay R350 extends from ground by way of the contacts 321, 333 and 353, the off-normal springs 367 and the winding of R350 to battery. When thus energized, the relay R350 locks to ground over a circuit including the off-normal springs 367 and the contacts 353, 352 and 346. At its contacts 351, the relay R350 prepares the operating circuit for the rotary magnet 365. When the second impulse is transmitted to the line relay R310, the vertical magnet 364 is again energized and operates to elevate the wiper carriage structure a second step, so that the wipers 360 to 363, inclusive, are positioned opposite the second level of contacts in the associated contact field. Incident to the movement of these wipers to a position opposite an even-numbered level of bank contacts, the normal post springs 305 are disengaged to reopen the prepared point in the operating circuit for the release relay R240.

Shortly following the end of the first digit, the transfer relay R330 restores. In releasing, this relay opens its contacts 331 to interrupt the initially completed circuit for energizing the hold relay R320. At its contacts 332, the relay R330 opens the above-traced circuit for energizing its upper winding in parallel with the vertical magnet 364, thereby to prevent further impulses from being transmitted to the vertical magnet. At its contacts 333, the relay R330 opens the previously traced operating circuit for the trunk hunting relay R350. At its contacts 334, the relay R330 completes the prepared operating circuit for the rotary magnet 365, this circuit extending from ground by way of the contacts 321, 334 and 351, and the winding of the magnet 365 to battery.

When the rotary magnet 365 is energized over the above-traced circuit, it operates, in conjunction with its associated ratchet and pawl mechanism, to rotate the wipers 360 to 363, inclusive, into engagement with the contacts forming the first contact set of the selected second level. At its contacts 353, the magnet 365 opens the above-traced locking circuit for the trunk hunting relay R350. When thus deenergized, the relay R350 restores and opens its contacts 351 to interrupt the operating circuit for the rotary magnet 365. At its contacts 352, the relay R350 opens another point in its own locking circuit. Further operation of the magnet 365 depends upon the idle or busy condition of the selected first trunk in the selected group, i. e. the trunk terminated at the first set of contacts in the selected contact level and extending to the first connector switch of the selected group. If this trunk is busy, the private or test conductor thereof is marked with ground potential and, accordingly, the trunk hunting relay R350 is reenergized over a circuit which includes the grounded wiper 361, the contacts 342 and 353, the off-normal springs 367, and the winding of R350 to battery. In reoperating, the trunk hunting relay R350 again locks to ground over a path including its contacts 352. At its contacts 351, the relay R350 recompletes the operating circuit for the rotary magnet 365. The magnet 365, in reoperating, again deenergizes the relay R350 and advances the wipers 360 to 363, inclusive, a second step, wherein they engage the contacts terminating the conductors of the trunk extending to the second connector switch of the selected group. If this connector switch is also busy the trunk hunting relay R350 reoperates to again close the operating circuit for the rotary magnet 365, whereby the wipers 360 to 363, inclusive, are advanced a third step to select the third connector switch of the group. This stepping operation on the part of the wipers 360 to 363 continues until an idle connector switch of the group is found or until all of the connector switches have been tested and found to be busy.

During the trunk hunting operation just described, the line switching relay R340 is short-circuited until a trunk extending to an idle connector switch is found, the path for short-circuiting this relay extending from the grounded test wiper 361 by way of the contacts 342, the winding of R340, the cam springs 304, and the contacts 321 back to ground. When, however, a trunk extending to an idle one of the connector switches is found, the test wiper 361 is disconnected from ground. When the short-circuiting path just traced is thus opened, the relay R340 is energized in series with the trunk hunting relay R350 over a circuit which extends from ground by way of the contacts 321, the cam springs 304, the winding of R340, the contacts 353, the off-normal springs 367 and the winding of R350 to battery. The winding of the relay R340 is of relatively high resistance as compared with the resistance of the winding of the relay R350. Accordingly, the current traversing the circuit just traced is insufficient to cause the reoperation of the trunk hunting relay R350. The relay R340, however, operates when energized in this circuit, and immediately opens its contacts 346 further to interrupt the above-traced locking circuit for the trunk hunting relay R350. At its contacts 347, the relay R340 opens another point in the operating circuit for the release magnet 366. At its contacts 348, the relay R340 further prepares the operating circuit for the timing relay R250. At its contacts 342, the relay R340 opens the above-traced circuit over which the trunk hunting relay R350 is energized during the trunk hunting operation. At its contacts 343, the relay R340 connects the test wiper 361 to the test conductor C135 of the selector switch 12, thereby to prepare alternative holding circuits for the magnet 110, and the line relay R220. At its contacts 344, the relay R340 opens the above-traced operating circuit for the line relay R310. At its contacts 345, the relay R340 completes a circuit for energizing the pilot lamp 105a in series with the line relay of the selected connector switch. At its contacts 341, the relay R340 completes a circuit for energizing the pulsing relay embodied in the selected connector switch.

Assuming that the illustrated connector switch 13 is selected through operation of the selector switch 12 in the manner explained above, the pilot lamp 105a is energized in series with the line relay R410 and the pulsing relay R440 is energized, incident to the operation of the line switching relay R340. The circuit for energizing the line relay R410 may be traced as extending from ground by way of the pulsing springs 102a, the off-normal springs 103a, the filament of the lamp 105a, the contact springs 108, the contact spring 119, C134, the contacts 265 and 242, C207, the contacts 345, the wiper 362, C382, the contacts 404 and the winding of R410 to battery. When energized in this circuit, the relay R410 operates and closes its contacts 411 to complete a circuit through the off-normal springs 477 for energizing the hold relay R420. At its contacts 412, the relay R410 opens a point in the circuit for transmitting impulses successively to the two magnets 474 and 475.

The relay R420, in operating, closes its contacts 423 to prepare the common portion of the pulsing circuit for the two enumerated magnets, and locks to ground over a path including its contacts 422 and the contacts 411. At its contacts 424, the relay R420 prepares the operating circuits for the transfer relays R450 and R460. At its contacts 425, the relay R420 opens a point in the operating circuits for the release magnets 476 and 485. At its contacts 421, the relay R420 completes the prepared alternative locking circuits for the magnet 110 and the line relay R220, these circuits commonly extending from ground by way of the contacts 421, C381, the wiper 361, and the contacts 343 to the conductor C206 where they divide, one circuit extending through the contacts 262 and the lower winding of R220 to battery, and the second branch extending by way of the contacts 241, C135, the contact spring 120, the contacts 101 and 115 in parallel, and the upper or BCO winding of the magnet 110 to battery. When ground potential is impressed upon the test conductor C381 of the trunk 18 through operation of the hold relay R420, a locking circuit is also prepared for the supervisory relay R400, and the connector switch 13 is marked against seizure through any of the other selector switches having access thereto.

The above-mentioned circuit for energizing the pulsing relay R440 may be traced as extending from ground by way of the contacts 794, C696, the contacts 632, C685, the contacts 431, the wiper 360, C380, and the winding of R440 to battery. When energized in this circuit, the relay R440 opens its contacts 441 and 442 further to interrupt the incomplete circuits for transmitting current pulses to the operating magnets of the indicators which are to be selected. At its contacts 443, the relay R440 opens a point in one of the available circuits for energizing the transfer control relay R430. Following the operations just described the connector switch 13 is conditioned to respond to the impulses of the second digit of the identification number 247 assigned to the calling doctor.

When the line switching relay R340 operates to deenergize the line relay R310 in the manner explained above, the line relay restores and opens its contacts 312 to deenergize the hold relay R320. The hold relay, in releasing, opens its contacts 321 to interrupt the multiple holding circuits for the magnet 110, the line relay R220 and the line switching relay R340. At its contacts 324, the relay R320 further prepares the operating circuit for the release magnet 366. From this explanation it will be understood that after the connector switch 13 is selected through the selector switch 12, only the line switching relay R340 is operated in the selector switch. This relay is held energized in a circuit which may now be traced as extending from ground by way of the contacts 421, C381, the wiper 361, the contacts 343, the cam springs 304, the winding of R340, the contacts 353, the off-normal springs 367 and the winding of R350 to battery.

As indicated above, if all of the connector switches of the selected group are busy at the time the searching operation of the selector switch 12 is initiated, the rotary magnet 365 continues to operate until the wipers 360 to 363, inclusive, are stepped to the eleventh rotary off-normal position thereof. Incident to the eleventh step of these wipers, the cam springs 304 are disengaged to open a point in the previously traced operating circuit for the line switching relay R340, and the cam springs 303 are moved into engagement to condition the busy signal relay R300 for control by the pulse generator 306. This generator is arranged to transmit ground pulses over the pulsing lead 302 at a rate of approximately 120 impulses per minute. Each time a ground pulse is transmitted over this lead, the busy signal relay R300 is energized to complete an obvious locking circuit for the line relay R310. Each time this locking circuit is completed the winding of the line relay is excluded from the circuit over which the pilot lamp 105a is energized. Accordingly, this lamp is deenergized. Obviously, the busy signal relay R300 restores to again include the winding of the line relay R310 in the circuit for energizing the lamp 105a at the end of each ground pulse transmitted over the lead 302 by the generator 306. The intermittent increase in the energization of this lamp results in the production of a flickering signal, which serves to inform the calling doctor that the desired control connection cannot be set up. The manner in which the partially completed connection is released is explained in detail hereinafter.

After the connector switch 13 has been seized through the selector switch 12, in the manner explained above, and when the second digit "4" of the doctor's identification number 247 is dialed at the station A, the off-normal springs 103a are again opened to exclude the pilot lamp 105a from the pulsing circuit, and the pulsing springs 102a are opened and closed four times so that four impulses are transmitted to the line relay R410. This relay functions to repeat the impulses to the transfer control relay R430 and the vertical magnet 474. Thus each time the relay R410 restores it closes its contacts 412 to energize the relay R430 in a circuit including the contacts 464 and 423. At its contacts 411, the relay R410 opens the circuit for energizing the hold relay R420. At its contacts 412, the relay R410 also completes the circuit for energizing the vertical magnet 474, this circuit extending from ground by way of the contacts 412, 464 and 423, the wiper 483 and the engaged first contacts of the contact sets 481 and 482, and the winding of the magnet 474 to battery. From the above explanation it will be understood that the relay R420 operates at the beginning of the open-circuit period of the first impulse transmitted to the line relay R410. Due to its slow-to-release characteristic, this relay remains operated until shortly after the train of four impulses is ended. Similarly, the slow-acting hold relay R420 does not restore in response to the intermittent deenergization of its winding. In operating, the relay R430 closes its contacts 431 to complete a circuit including the contacts 424 for energizing the slow-to-release relay R435. At its contacts 432, the relay R430 opens a point in the operating circuit for the magnet 484. The relay R435, upon operating, closes its contacts 436 to prepare the last-mentioned circuit.

Each time the vertical magnet 474 is energized in the above-traced pulsing circuit, it operates in conjunction with its associated ratchet and pawl mechanism to elevate the wiper carriage structure of the connector switch 13 one step, so that at the end of the second digit dialed at the calling station A the wipers 471 to 473, inclusive, are left standing opposite the fourth level of bank contacts in the associated contact field. Incident to the first vertical step of the wiper carriage structure, the off-normal springs 478 are moved into engagement to prepare the operating circuit for the release magnet 476; and the off-normal springs 477 are disengaged to interrupt the initially completed circuit for energizing the hold relay R420. Shortly following the end of the second digit, and during the inter-digit pause between this digit and the third or final digit the transfer control relay R430 restores. In releasing, this relay opens its contacts 431 to interrupt the operating circuit for the relay R435. At its contacts 432, the relay R430 completes the prepared operating circuit for the magnet 484, this circuit extending from ground by way of the contacts 424, 432 and 436, and the winding of the magnet 484 to battery. When energized in this circuit, the magnet 484 operates to advance the wiper 483 one step from its illustrated normal position. When this wiper is moved off normal, the above-traced operating circuit for the vertical magnet 474 is interrupted and the operating circuit for the rotary magnet 475 is prepared. Shortly after the magnet 484 operates, the relay R435 restores and opens its contacts 436 to deenergize the magnet 484. Incident to the off-normal movement of the wiper 483, the off-normal springs 486 are moved into engagement to prepare the operating circuit for the release magnet 485, and the off-normal springs 487 are disengaged to open another point in the operating circuit for the release magnet 476. Following the operations just described, the connector switch 13 is conditioned to respond to the impulses of the third digit "7" of the calling doctor's "in" identification number.

When this digit is dialed at the station A, the pulsing springs 102a are opened and closed seven times so that seven impulses are transmitted to the line relay R410. This relay, in following the impulses, functions to transmit a corresponding number of current pulses to the transfer relay R430 and the rotary magnet 475. The circuit for energizing the rotary magnet 475 may now be traced as extending from ground by way of the contacts 412, 464 and 423, the wiper 483 and the engaged second contacts of the contact sets 481 and 482, and the winding of the magnet 475 to battery. Upon reoperating at the beginning of the third digit, the relay R430 recompletes the operating circuit for the relay R435. The last-mentioned relay, in reoperating, functions to reprepare the operating circuit for the magnet 484.

Each time the rotary magnet is energized in the above-traced pulsing circuit, it operates in conjunction with its associated ratchet and pawl mechanism to rotate the wiper carriage structure of the connector switch 13 one step so that at the end of the third digit the wipers 471 to 473, inclusive, are left standing in engagement with the seventh contacts of the fourth contact level in the associated contact field. In this position of the wiper carriage structure, the enumerated wipers respectively engage the contacts terminating the conductors C513, C514 and C515 which extend to the indicators individual to the calling doctor No. 247. At the end of the third digit dialed at the calling station A, the transfer control relays R430 and R435 restore in sequence to transmit a second current pulse to the operating magnet 484 of the minor switch 480. In reoperating, the magnet 484 advances the wiper 483 a second step wherein the respective third contacts of the two contact sets 481 and 482 are bridged by this wiper. Immediately the wiper 483 is stepped to this position, a circuit is completed for energizing the lower winding of the relay R460 and the upper winding of the relay R450 in parallel. This circuit extends from ground by way of the contacts 424, the wiper 483 and the engaged third contacts of the two contact sets 481 and 482, and the parallel-connected windings of the two relays R450 and R460 to battery. When thus energized, the relay R460 closes its contacts 461 further to prepare the circuit for transmitting current pulses to the operating magnet 501b of the indicator 500b. At its contacts 463, the relay R460 prepares a circuit for transmitting a first reset pulse to the magnets 501b of the indicator 500b. At its contacts 464, the relay R460 opens another point in the previously traced circuits for energizing the relay R430, the vertical magnet 474 and the rotary magnet 475. At its contacts 465, the relay R460 opens another point in the incomplete operating circuit for the release magnet 485. At its contacts 466, the relay R460 further prepares the operating circuit for the timing relay R250.

The relay R450, upon operating, closes its contacts 451 to prepare a circuit for transmitting current pulses to the operating magnet 501a of the indicator 500a. At its contacts 454, the relay R450 opens a point in an alternative circuit for energizing the transfer relay R460. At its contacts 455, the relay R450 opens another point in the incomplete operating circuit for the release magnet 485. At its contacts 456, the relay R450 further prepares the operating circuit for the timing relay R250. At its contacts 451, the relay R450 also completes a circuit for energizing the relay R400. The character of this circuit depends upon the positions occupied by the selected indicators. If any one of these indicators occupies an off-normal position, the contact springs 502 thereof are engaged and the contact springs 503 are disengaged. Assuming, by way of example, that the tens indicators of the selected display units occupy positions wherein they respectively display the number "5," so that the contact springs 502a of the indicator 500a, for example, are engaged, the circuit for energizing the supervisory relay R400 may be traced as extending from ground by way of the springs 502a, the winding of the magnet 501a, C514, the wiper 472, the contacts 451 and 403, and the lower winding of R400 to battery. The current traversing this circuit and the parallel branches thereof which extend through the windings of the selected other tens indicators, is insufficient to cause the operation of these indicators. If all of the selected indicators occupy their respective normal or blank positions, the circuit for energizing the relay R400 is completed by the transfer relay R460 and extends from ground by way of the contacts 401 and 463, the wiper 473, C515, the contact springs 502a, etc., the parallel-connected windings of the operating magnets in the selected tens indicators, C514, the wiper 472, the contacts 451 and 403, and the lower winding of R400 to battery.

When energized over either of the above-traced circuits, the relay R400 locks to ground over a path including its preliminary make contacts 402 and the contacts 421. At its contacts 401, the relay R400 then disconnects the start conductor C515 from ground. At its contacts 403, the relay R400 opens a point in its operating circuit as traced above. At its contacts 406, the relay R400 completes the above-mentioned operating circuit for the timing relay R250, this circuit extending from ground by way of the contacts 466, 456 and 406, C383, the wiper 363, the contacts 348, C218, the contacts 222 and the winding of R250 to battery. At its contacts 405, the relay R400 prepares an alternative operating circuit for the transfer control relay R430. At its contacts 404, the relay R400 opens the path normally short-circuiting the resistor 407, whereby this resistor is serially included in the circuit over which the relay R410 and the pilot lamp 105a are energized. The current traversing the pilot lamp 105a is thus decreased, with a resulting decrease in the illumination of this lamp. This decrease in the light transmitted by the lamp 105a serves to inform the calling doctor that the desired indicators have been selected. At this point it may be noted that, after the two transfer relays R450 and R460 and the supervisory relay R400 operate, the control of the switching equipment is transferred from the calling control station A to the automatic pulse sender 15. It will further be apparent that no additional operations are required on the part of the calling doctor in order to cause the selected indicators to be reset to display a numerical indication of the floor on which the doctor No. 247 is located. The continued energization of the pilot lamp 105a, however, serves to indicate the busy condition of the control station A from which the control connection was routed to the desired indicator.

When energized over the above-traced circuit, the relay R250 opens its contacts 253 further to interrupt the incomplete operating circuit for the release relay R230. At its contacts 254, the relay R250 opens a point in the prepared locking circuits for the two relays R230 and R240. The relay R250 is equipped with a weighted vibratory contact spring 251, which is set in vibration when the armature controlled by this relay is attracted. So long as vibration of this weighted contact spring continues, the contacts 252 are only intermittently engaged for short time intervals. After a predetermined period elapses, however, the vibration of the contact spring 251 is arrested so that the contacts 252 remain closed. When this occurs, the relay R260 is energized in an obvious circuit and, accordingly, operates after a short interval. The purpose of delaying the operation of the start sending relay R260 for a short time interval after the indicators have been selected and in the manner just described, is to permit the control connection to be released in the event the calling doctor discovers that he has dialed the wrong identification number. This prevents the settings of the erroneously selected indicators from being disturbed.

In operating, the start sending relay R260 closes its contacts 269 to complete a multiple path for impressing ground potential upon the timer start lead C226. At its contacts 268, the relay R260 prepares multiple locking circuits for the two relays R230 and R240. At its contacts 265 the relay R260 prepares an alternative operating circuit for the release relay R230. At its contacts 264, the relay R260 completes an alternative circuit for energizing the line relay R410 of the operated connector switch 13, this circuit extending from ground by way of the contacts 264 and 242, C207, the contacts 345, the wiper 362, C382, the resistor 407 and the winding of R410 to battery. After this circuit is completed, the relay R260 opens its contacts 265 to interrupt the above-traced circuit for energizing the line relay R410 in series with the pilot lamp 105a. At its contacts 263, the relay R260 completes a circuit for energizing the pilot lamp 105a in series with the upper winding of the line relay R220, this circuit extending from ground by way of the pulsing springs 102a, the shunt springs 103a, the filament of the lamp 105a, the contact springs 108, the contact spring 119, C134, the contacts 263, and the upper winding of R220 to battery. The upper winding of the relay R220 is of relatively low resistance. Accordingly, the pilot lamp 105a is more brilliantly illuminated when this winding is substituted for the winding of the line relay R410 in the circuit for energizing the pilot lamp 105a. This increase in the intensity of the signal serves to inform the calling doctor that the resetting of the selected indicators is about to be started.

At its contacts 261, the relay R260 completes a multiple path including the contacts 252 for impressing ground potential upon the connected test conductors C135 and C381, thereby to provide multiple locking circuits for the relays R340 and R400, and the magnet 110. At its contacts 261, the relay R260 also completes a locking circuit for itself, this circuit extending from ground by way of the contacts 421, C381, the wiper 361, the contacts 343, C206, the contacts 261, and the winding of R260 to battery. After the contacts 261 are closed, the relay R260 opens its contacts 262 to deenergize the lower winding of the line relay R220.

The energization of the upper winding of the relay R220 in series with the pilot lamp 105a is insufficient to maintain this relay in its operated position. Accordingly, when the circuit for energizing the lower winding of the relay R220 is opened at the contacts 262, this relay restores and opens its contacts 221 further to interrupt one of the incomplete operating circuits for the release relay R230. At its contacts 222, the relay R220 opens the above-traced operating circuit for the relay R250. At its contacts 224, the relay R220 opens a point in the initially prepared locking circuits for the two relays R230 and R240. At its contacts 225, the relay R220 opens one of the multiple paths over which the timer start lead C226 is connected to ground. At its contacts 223, the relay R220 prepares the operating circuit for the release relay R240.

The relay R250, upon restoring, opens its contacts 252 to interrupt the operating circuit for the relay R260 and the above-traced multiple path for impressing ground potential upon the connected test conductors C381 and C135. At its contacts 253, the relay R250 further prepares the above-mentioned alternative operating circuit for the release relay R230. At its contacts 254, the relay R250 reprepares the locking circuits for the two relays R230 and R240.

The start sending relay R260, upon operating, also initiates the operation of the automatic pulse sender 15. Thus, when this relay closes its contacts 266, a circuit including the conductor C214 and the contacts 682 is completed for energizing the lower winding of the start relay R650. At its contacts 267, the relay R260 also completes a circuit for energizing the slow-acting holding relay R680, this circuit extending from ground by way of the contacts 283, 267 and 244, C215 and the winding of R680 to battery. The relay R650, upon operating, closes its contacts 651 to prepare operating and locking circuits for the release relay R640. At its contacts 652, the relay R650 prepares the operating and locking circuits for the digit spacing control relays R790 and R600. At its contacts 653, the relay R650 prepares a circuit for initiating the operation of the three pulse generating relays R610, R615 and R620. At its contacts 654, the relay R650 prepares the operating and locking circuits for certain of the relays in the pulse counting network 31. The relay R680, upon operating, opens its contacts 682 to interrupt the path normally short-circuiting the upper winding of the start relay R650, thereby to permit the two windings of the latter relay to be energized in series over a circuit including the grounded conductor C214. At its contacts 681, the relay R680 completes an obvious circuit for energizing the relay R660.

The relay R660, upon operating, closes its contacts 661 to complete the prepared operating circuit for the slow-to-release relay R620, this circuit extending from ground by way of the contacts 654 and 608, C673, the contacts 797, C674, the contacts 661, C671, the contacts 786, C670, the contacts 653 and 616, and the winding of R620 to battery. Thus the operation of the three pulse generating relays R610, R615 and R620 is initiated. More specifically, the relay R620, upon operating, locks up in a circuit including its contacts 623 and the contacts 616, and closes its contacts 621 to complete an obvious circuit for energizing the relay R630. At its contacts 622, the relay R620 prepares a locking circuit for the stop relay R780. The relay R630, upon operating, closes its contacts 631 to complete an obvious circuit for energizing the relay R615. The relay R615 now operates and opens its contacts 616 to deenergize the relay R620, whereby the three relays R620, R630 and R615 are caused to release in the order named, and in an obvious manner. The relay R615, upon restoring, closes its contacts 616 to recomplete the operating circuit for the relay R620. Thus a second cycle of operation of the three pulse generating relays is initiated.

The operating cycles of the three pulse generating relays are counted through operation of the relays in the network 31. Thus when the relay R630 first operates, a circuit is completed for energizing the first counting relay R710, this circuit extending from ground by way of the contacts 654 and 608, C673, the contacts 797, C674, the contacts 633, C698, the contacts 735, 756, 746, 736, 726 and 716, and the winding of R710 to battery. In operating, the relay R630 also functions to complete a path for short-circuiting the lower winding of the transfer relay R700, this path extending from the conductor C674 by way of the lower winding of R700, the contacts 701, C699 and the contacts 634 back to the conductor C674.

When energized in the above-traced circuit, the relay R710 locks to ground over a path including the contacts 713 and 723, the lower winding of R700, the contacts 797, C673, and the contacts 608 and 654. At its contacts 711 and 712, the relay R710 prepares two alternative circuits which respectively include the first and sixth marking leads over which the stop relay R780 may be energized in the manner pointed out below. At its contacts 714, the relay R710 prepares the operating circuit for the second counting relay R720. At its contacts 716, the relay R710 opens a point in its own operating circuit. At its contacts 715, the relay R710 completes an alternative locking circuit for itself, this alternative circuit extending from ground by way of the contacts 654 and 608, C673, the contacts 797, C674, the contacts 633, C698, the contacts 795, 704 and 715, and the winding of R710 to battery.

As the first cycle of operation of the three pulse generating relays progresses, the relay R630 restores to interrupt the operating circuit for the relay R710 and the path short-circuiting the lower winding of the transfer relay R700. At this time the lower winding of the transfer relay is energized in series with the relay R710 over a circuit which extends by way of the grounded lead C674, the lower winding of R700, the contacts 723 and 713, and the winding of R710 to battery. The current traversing this circuit is sufficient to maintain the relay R710 in its operated position and to cause the operation of the relay R700. In operating, the relay R700 closes its contacts 702 to prepare an alternative locking circuit for itself. At its contacts 704, the relay R700 opens one of the above-traced and now incomplete locking circuits for the relay R710. At its contacts 703, the relay R700 further prepares the operating circuit for the second counting relay R720.

When the relay R630 operates during the second cycle of operation of the three pulse generating relays R615, R620 and R630, the operating circuit for the second counting relay R720 is completed. This operating circuit may now be traced as extending by way of the grounded lead C674, the contacts 633, C698, the contacts 735, 703 and 714, and the winding of R720 to battery. In operating the second time, the relay R630 also completes the prepared locking circuit for the transfer relay R700, this circuit extending by way of the grounded lead C674, the contacts 634, C699, the contacts 702, and the upper winding of R700 to battery.

The relay R720, upon operating, locks to ground over a path including the contacts 724 and 733, and the grounded conductor C674. At its contacts 725, the relay R720 prepares the operating circuit for the third counting relay R730. At its contacts 726, the relay R720 opens another point in the above-traced operating circuit for the relay R710. At its contacts 723, the relay R720 opens the established locking circuit for the relay R710, causing the latter relay to restore. At its contacts 721 and 722, the relay R720 prepares two alternative circuits, which respectively include the second and fifth marking leads, over which the stop relay R780 may be energized. The relay R710, upon restoring, opens its contacts 713 further to interrupt its locking circuit and the circuit for energizing the lower winding of the transfer relay R700. At its contacts 714, the relay R710 interrupts the operating circuit for the relay R720. At its contacts 716, the relay R710 reprepares its own operating circuit. At its contacts 711 and 712, the relay R710 opens the prepared circuits, including the first and sixth marking leads, over which the stop relay R780 may be energized.

When the relay R630 restores during the second operating cycle of the pulse generating relays, the above-traced locking circuit for the transfer relay R700 is opened at the contacts 634. The relay R700 accordingly restores and closes its contacts 704 further to prepare the operating circuit for the third counting relay R730. At its contacts 703, the relay R700 opens another point in the operating circuit for the second counting relay R720. At its contacts 702, the relay R700 further interrupts its own locking circuit. At its contacts 701, the relay R700 reprepares the path for short-circuiting its lower winding.

When the relay R630 operates during the third operating cycle of the pulse generating relays, the third counting relay R730 is energized in its operating circuit, which may now be traced as extending by way of the grounded lead C674, the contacts 633, C698, the contacts 705, 704 and 725, and the winding of R730 to battery. In operating the third time, the relay R630 also closes its contacts 634 to recomplete the previously traced path for short-circuiting the lower winding of the transfer relay R700.

In operating, the relay R730 locks to the grounded lead C674 over a path including the contacts 734 and 743, and the lower winding of R700. At its contacts 735, the relay R730 prepares the operating circuit for the fourth counting relay R740. At its contacts 736, the relay R730 opens another point in the previously traced operating circuit for the relay R710. At its contacts 731 and 732, the relay R730 prepares circuits, which respectively include the third and eighth marking leads, over which the stop relay R780 may be energized. At its contacts 733, the relay R730 interrupts the locking circuit for the relay R720 causing the latter relay to restore. In releasing, the relay R720 opens its contacts 724 further to interrupt its own locking circuit, closes its contacts 723 to reprepare the locking circuit for the first counting relay R710, and closes its contacts 726 further to prepare the previously traced operating circuit for the relay R710. At its contacts 721 and 722, the relay R720 opens the prepared circuits, including the second and seventh marking leads, respectively, over which the stop relay R780 may be energized.

When the relay R630 restores during the third operating cycle of the pulse generating relays, the two paths short-circuiting the lower winding of the transfer relay R700 are interrupted at the contacts 633 and 634, respectively. Incident to this operation, the lower winding of the relay R700 is energized in series with the third counting relay R730, over a circuit which includes the grounded conductor C674, and the contacts 743 and 734. In reoperating, the relay R700 again closes its contacts 702 to reprepare its own locking circuit, and closes its contacts 703 further to prepare the operating circuit for the fourth counting relay R740.

When the relay R630 operates during the fourth operating cycle of the three pulse generating relays, it recloses its contacts 634 to again complete the locking circuit for the transfer relay R700, and closes its contacts 633 to complete the prepared operating circuit for the fourth counting relay R740. The latter circuit may now be traced as extending from the grounded lead C674 by way of the contacts 633, C698, the contacts 705, 703 and 735, and the winding of R740 to battery. In operating, the relay R740 locks to the grounded lead C674 over a path including the contacts 744 and 753, and closes its contacts 745 to prepare the operating circuit for the fifth counting relay R750. At its contacts 746, the relay R740 opens another point in the incomplete operating circuit for the first counting relay R710. At its contacts 741 and 742, the relay R740 prepares two alternative circuits, which respectively include the fourth and ninth marking leads, over which the stop relay R780 may be energized. At its contacts 743, the relay R740 interrupts the circuit over which the relay R730 is energized in series with the lower winding of the relay R700. When this circuit is broken, the relay R730 restores. In releasing, the relay R730 opens its contacts 735 to interrupt the operating circuit for the relay R740, closes its contacts 736 further to prepare the operating circuit for the relay R710, and closes its contacts 733 to reprepare the locking circuit for the relay R720. At its contacts 734, the relay R730 opens another point in its own locking circuit. At its contacts 731 and 732, the relay R730 opens the prepared circuits, which respectively include the third and eighth marking leads, over which the stop relay R780 may be energized.

When the relay R630 restores during the fourth operating cycle of the three pulse generating relays, the locking circuit for the transfer relay R700 is opened at the contacts 634. The last-mentioned relay now restores and closes its contacts 704 further to prepare the operating circuit for the fifth counting relay R750.

When the relay R630 operates during the fifth operating cycle of the three pulse generating relays, the contacts 633 are reclosed to complete the prepared operating circuit for the fifth counting relay R750, this circuit extending from the grounded lead C674 by way of the contacts 633, C698, the contacts 705, 704 and 745 and the winding of R750 to battery. In operating, the relay R750 locks to the grounded lead C674 over a path including the contacts 755, 704 and 705, C698, and the contacts 633. At its contacts 754, the relay R750 completes an obvious circuit for energizing the reflexing relay R760. At its contacts 756, the relay R750 opens another point in the operating circuit for the relay R710. At its contacts 751, the relay R750 prepares a circuit including the fifth marking lead over which the stop relay R780 may be energized. At its contacts 752, the relay R750 prepares an obvious alternative circuit for energizing the stop relay.

At its contacts 753, the relay R750 interrupts the above-traced locking circuit for the fourth counting relay R740. The latter relay now restores and opens its contacts 745 to interrupt the operating circuit for the relay R750. At its contacts 744, the relay R740 opens another point in its own locking circuit. At its contacts 743, the relay R740 reprepares the locking circuit for the relay R730. At its contacts 746, the relay R740 reprepares the operating circuit for the relay R710. At its contacts 741 and 742, the relay R740 opens the two prepared circuits, including the fourth and ninth marking leads, over which the stop relay R780 may be energized.

The relay R760, upon operating, closes its contacts 761 to complete an obvious path for short-circuiting the winding of the transfer relay R770. Shortly following the operation of the relay R760, and during the continued operation of the three pulse generating relays, the relay R630 restores and opens its contacts 633 to interrupt the locking circuit for the fifth counting relay R750. In releasing, the relay R750 opens its contacts 751 and 752 to interrupt the prepared operating circuits for the stop relay R780, and closes its contacts 753 to reprepare the locking circuit for the fourth counting relay R740. At its contacts 755, the relay R750 opens another point in its own locking circuit. At its contacts 756, the relay R750 prepares another point in the operating circuit for the first counting relay R710. At its contacts 754, the relay R750 opens the path short-circuiting the winding of the transfer relay R770, permitting this winding to be energized in series with the winding of the relay R760 over a circuit which includes the grounded conductor C674 and the contacts 761. The current traversing this circuit is sufficient to maintain the reflexing relay R760 operated and to cause the operation of the transfer relay R770. In operating, the latter relay closes its contacts 772 to prepare the five circuits which respectively include the sixth to ninth marking leads, and the contacts 752, for energizing the stop relay R780. At its contacts 771, the relay R770 opens a point in the common portion of the five circuits, which respectively include the first to fifth marking leads, and over which the stop relay R780 may be energized.

Following the operation of the transfer relay R770, and during the continued operation of the three pulse generating relays, the transfer relay R700 coacts with the five counting relays to count the sixth to tenth impulses of the pulse train under consideration. The manner in which these relays respond to the sixth to tenth operating cycles of the pulse generating relays is exactly the same as just described with reference to the counting of the first to fifth impulses.

When the fifth counting relay R750 operates the second time to count the tenth cycle of operation of the three pulse generating relays, it closes its contacts 752 to complete a circuit through the contacts 772 for energizing the stop relay R780. In operating, the relay R780 locks to ground over a path including the contacts 782, C688, and the contacts 622 of the operated pulse generating relay R620. At its contacts 781, the relay R780 completes a path including the conductor C686, and the contacts 601, and 641, for impressing ground potential upon the transfer lead C208, for a purpose to be described hereinafter. At its contacts 783, the relay R780 completes the prepared operating circuit for the relay R790, this circuit extending from ground by way of the contacts 652, C689, the contacts 783, C695, the contacts 605, C693 and the winding of R790 to battery. At its contacts 784, the relay R780 opens a point in an incomplete locking circuit for the two relays R790 and R600. At its contacts 785, the relay R780 opens a point in the operating circuit for the relay R600. At its contacts 786, the relay R780 interrupts the previously traced operating circuit for the relay R620.

The relay R790, upon operating, closes its contacts 791 to complete a multiple circuit including the conductor C690 for energizing the relay R660. At its contacts 792, the relay R790 prepares a locking circuit for itself and the relay R600. At its contacts 793, the relay R790 prepares the operating circuit for the relay R600. At its contacts 794, the relay R790 opens the path normally short-circuiting the winding of the relay R610, whereby this winding is included in the previously traced operating circuit for the pulsing relay R440. At its contacts 795, the relay R790 opens a point in the common portion of the previously traced operating circuits for the five counting relays of the counting network 31. At its contacts 797, the relay R790 disconnects the pulsing and locking lead C674 from ground. At its contacts 796, the relay R790 prepares an alternative path for impressing ground potential upon the lead C674.

When the relay R790 operates, in the manner just described, to disconnect the lead C674 from ground and to interrupt the operating and locking circuits for the fifth counting relay R750, this relay and the two relays R760 and R770 restore. Thus the relays of the counting network 31 are all released. When the above-traced path short-circuiting the winding of the relay R610 is opened at the contacts 794, to include the winding of the relay R610 in the circuit for energizing the pulsing relay R440, the relay R610 operates and closes its contacts 611 to prepare an obvious alternative circuit for transmitting current pulses to the five counting relays of the network 31. This circuit is utilized to control the operation of the counting relays during the spacing interval which separates the impulses of the first impulse train, just considered, from the impulses of the second train. In this regard, it is pointed out that the counting relays as controlled by the three pulse generating relays are utilized to measure the inter-digit pause between successive digits or impulse trains.

During the final portion of the tenth operating cycle of the three pulse generating relays, the relay R620 restores and opens its contacts 622 to interrupt the above-traced locking circuit for the stop relay R780. The relay R780 now restores and opens its contacts 781 to disconnect the transfer lead C208 from ground. At its contacts 782, the relay R780 opens another point in its own locking circuit. At its contacts 786, the relay R780 reprepares the operating circuit for the pulse generating relay R620. At its contacts 785, the relay R780 completes the prepared operating circuit for the relay R600, this circuit extending from ground by way of the contacts 652, C689, the contacts 785 and 793, C694 and the lower winding of R600 to battery. At its contacts 784, the relay R780 completes a circuit for energizing the upper winding of the relay R600 in series with the relay R790, this circuit extending from ground by way of the contacts 652, C689, the contacts 784, C691, the upper winding of R600, C692, the contacts 792 and the winding of R790 to battery. After the last-mentioned circuit is completed, the relay R780 opens its contacts 783 to interrupt the operating circuit for the relay R790.

The relay R600, upon operating, opens its contacts 605 further to interrupt the operating circuit for the relay R790, and closes its contacts 604 to prepare a locking circuit for itself. At its contacts 601, the relay R600 opens another point in the above-traced path for impressing ground potential upon the transfer lead C208. At its contacts 602, the relay R600 prepares a circuit which includes the seventh marking conductor for energizing the stop relay R780 during the operation of the counting relays and the pulse generating relays to measure an inter-digit spacing interval. At its contacts 603, the relay R600 disconnects the control lead C217 from ground, for a purpose to be described hereinafter. At its contacts 606, the relay R600 shunts the pulsing contacts 632 of the pulse generating relay R630, to prevent current pulses from being transmitted to the pulsing relay R440 during the spacing interval. At its contacts 608, the relay R600 opens another point in the initially traced path for impressing ground potential upon the pulsing and locking lead C674. At its contacts 607, the relay R600 connects the lead C674 to ground over an alternative path which includes the contacts 796, C672, and the contacts 654.

Following the operation of the relay R600, the three pulse generating relays, operating in conjunction with the relays of the counting network 31, function to measure the inter-digit spacing interval. In this regard it will be noted that the automatic pulse sender has, at this time, completed its operation to produce ten impulses. These impulses are repeated by the relay R630 to the pulsing relay R440. More specifically, during each cycle of operation of the pulse generating relays, the relay R630 is operated for an interval, and during this interval the previously traced circuit for energizing the pulsing relay R440 is opened at the contacts 632. Accordingly, a train of ten impulses is transmitted to the pulsing relay R440 of the operated connector switch 13.

The pulsing relay R440 functions to repeat the ten impulses to the operating magnets of the selected indicators individual to the doctor No. 247 for the purpose of restoring the indicating drums of these indicators to their respective normal or blank positions. Thus each time the relay R440 restores, it closes its contacts 442 to complete the prepared circuit for energizing the operating magnet 501a of the tens indicator 500a, this circuit extending from ground by way of the contact springs 502a, the winding of the magnet 501a, C514, the wiper 472, the contacts 451 and 442, and the resistor 445 to battery. Similarly, a circuit is completed for energizing the operating magnet 501b of the units indicator 500b each time the relay R440 restores, this circuit extending from ground by way of the contact springs 502b, the winding of the magnet 501b, C513, the wiper 471, the contacts 461 and 441, and the resistor 444 to battery. When the pulsing relay R440 initially restores at the beginning of the restoring pulse train, the prepared alternative circuit for energizing the transfer control relay R430 is completed, this circuit extending from ground by way of the contacts 405, 443 and 423, and the winding of R430 to battery. In reoperating, the relay R430 recompletes the operating circuit for the relay R435, and opens a point in the operating circuit for the magnet 484. This operating circuit is further prepared at the contacts 436 when the relay R435 reoperates. Due to the slow-to-release characteristics thereof, the relays R430 and R435 remain in their respective operated positions until shortly after the restoring pulse train is ended.

Each time a current pulse is transmitted through operation of the pulsing relay R440 to the operating magnet 501a of the indicator 500a, for example, the drum of this indicator is advanced one step towards its normal or blank position. The display drums of the other indicators are correspondingly operated in response to the operation of the pulsing relay R440. In this regard, it is again pointed out that when the display drum of any indicator 500 occupies its normal or blank position, the associated cam 504 occupies a position such that the commutating springs 503 are engaged and the springs 502 are disengaged. In all other positions of the display drum, the commutating springs 502 are engaged. Accordingly, if the indicating drum of the register 500a, for example, is assumed to occupy its second off-normal position at the time the operation of the pulsing relay R440 is initiated, nine of the ten restoring pulses will be transmitted to the magnet 501a. At the end of the ninth step the cam 504a operates to open the commutating contact springs 502a, and to close the springs 503a, thereby to prevent the remaining restoring pulse of the train from producing further operation of the magnet 501a. In a manner similar to that just described, a portion or all of the restoring pulses transmitted by the relay R440 to the magnet 501b of the units indicator 500b may be utilized to drive the drum of this indicator back to its normal or blank position. Thus if the indicating drum of the register 500b occupies its fifth off-normal position, for example, at the time the operation of the relay R440 is initiated, six of the restoring pulses will be utilized to advance this drum to its normal or blank position. It will be understood from the above explanation that after a maximum of ten restoring pulses have been transmitted through operation of the relay R440 to the operating magnets of the selected indicators, all of the display drums of the selected indicators are restored to their normal or blank positions.

After ten restoring pulses have been counted by the automatic pulse sender 15, the relay R600 closes its contacts 606 to shunt the pulsing contacts 632, so that the pulsing relay R440 is held in its operated position. Accordingly, the two relays R430 and R435 are caused sequentially to restore, in the manner previously described, to transmit a current pulse to the operating magnet 484 of the minor switch 480. The resulting operation of this magnet causes the wiper 483 to be advanced out of engagement with its associated third contacts, and into engagement with its associated fourth contacts. With the wiper 483 in this position, the relay R460 is deenergized and an alternative circuit is completed for energizing the relay R450. This alternative circuit extends from ground by way of the contacts 424, the wiper 483 and the engaged fourth contacts of the two contact sets 481 and 482, and the lower winding of R450 to battery. The relay R460, in releasing, opens its contacts 463 further to interrupt the initially completed path over which ground potential was impressed upon the start conductor C515. At its contacts 462, the relay R460 connects this conductor to ground through the contacts 453 of the operated relay R450. At its contacts 461, the relay R460 opens the previously traced circuit over which the restoring pulses were transmitted to the units indicators of the selected display units. At its contacts 464, the relay R460 reprepares the initially traced operating circuit for the transfer control relay R430. At its contacts 465, the relay R460 closes a point in the incomplete operating circuit for the release magnet 485. At its contacts 466, the relay R460 opens a point in the incomplete operating circuit for the relay R240. Following the operations just described, the connector switch 13 is conditioned to respond to the impulses of the first reset pulse train, i. e., that utilized to reset the tens indicators of the selected display units to display the first digit of the floor number identifying the location of the calling doctor No. 247.

As indicated above, when the stop relay R780 operates at the end of the restoring pulse train, it closes its contacts 781 to connect the transfer lead C208 to ground. When ground potential is impressed upon this lead the relay R270 is energized thereover in a circuit which includes the contacts 281 and 296. The relay R270, upon operating, locks to ground over a path including the contacts 271, the winding of R280 and the contacts 266. In completing this locking circuit, the relay R270 obviously short-circuits the winding of the relay R280. Shortly thereafter the relay R780 restores and the relay R600 operates. When this occurs, the control lead C217 and the transfer lead C208 are both disconnected from ground in the manner previously explained. When ground potential is removed from the transfer lead C208, the path short-circuiting the winding of the relay R280 is broken, permitting this relay to be energized in series with the relay R270 over a circuit which includes the contacts 266 and 271. The current traversing this circuit is sufficient to maintain the relay R270 operated and to cause the operation of the relay R280. The latter relay, upon operating, opens its contacts 281 to interrupt the operating circuit for the relay R270, and closes its contacts 282 to prepare the operating circuit for the relay R290. At its contacts 283, the relay R280 interrupts the previously traced operating circuit for the hold relay R680. At its contacts 284, the relay R280 prepares the operating circuit for the group marking relay R200, it being noted in this regard that ground potential is removed from the control lead C217 before the relay R280 operates, whereby premature operation of the group marking relay R200 is prevented. The hold relay R680, upon restoring, closes its contacts 682 to short-circuit the upper winding of the start relay R650, and opens its contacts 681 to interrupt the operating circuit for the relay R660. Following the operations just described no further operation of the control network 16 occurs until the inter-digit spacing interval is ended.

After seven operating cycles of the three pulse generating relays R610, R615 and R620 are counted through operation of the counting network 31, the two relays R770 and R720 are energized in the manner previously described. The relay R720, upon operating, completes the prepared circuit for energizing the stop relay R780, this circuit extending from ground by way of the contacts 602, C687, the contacts 722 and 772, and the winding of R780 to battery. In operating, the relay R780 closes its contacts 783 to complete an alternative locking circuit for the relay R710, this circuit extending from ground by way of the contacts 652, C689, the contacts 783, C695, the contacts 604 and the lower winding of R600 to battery. At its contacts 781, the relay R780 reprepares the above-traced path for impressing ground potential upon the transfer lead C208. At its contacts 784 and 785, the relay R780 opens the initially completed operating and locking circuits for the two relays R790 and R600. The relay R790, upon restoring, opens its contacts 791 to deenergize the start sending relay R680. At its contacts 792, the relay R790 opens another point in the locking circuit for itself and the relay R600. At its contacts 793, the relay R790 opens another point in the operating circuit for the relay R600. At its contacts 794, the relay R790 again short-circuits the winding of the relay R610, causing the latter relay to restore. At its contacts 795, the relay R790 reprepares the initially traced operating circuits for the relays of the counting network 31. At its contacts 796, the relay R790 disconnects the pulsing and locking lead C674 from ground, thereby to deenergize the operated relays R720, R760 and R770 of the counting network 31. At its contacts 797, the relay R790 reprepares the other of the two paths for connecting the lead C674 to ground. When the three relays R720, R760 and R770 restore, the operating circuit for the stop relay R780 is opened and the counting network 31 is conditioned to count the impulses of the first or tens digit of the number identifying the floor of the hospital upon which the calling doctor No. 247 is located.

The relay R660, upon restoring, opens its contacts 661 further to interrupt the previously traced operating circuit for the pulse generating relay R620, whereby further operation of the pulse sender 15 following the spacing interval is predicated upon the reoperation of the hold relay R680, which is controlled from the control network 16. Shortly after the stop relay R780 operates, and when the seventh operating cycle of the pulse generating relays is completed, the relay R620 restores to interrupt the locking circuit for the stop relay. In releasing, the relay R780 opens its contacts 783 to deenergize the relay R600. At its contacts 781, the relay R780 opens the prepared path for impressing ground potential upon the transfer lead C208. At its contacts 784 and 785, the relay R780 reprepares the previously traced operating and locking circuits for the two relays R790 and R800. At its contacts 786, the relay R780 reprepares the operating circuit for the pulse generating relay R620.

The relay R600, upon restoring, closes its contacts 605 further to prepare the operating circuit for the relay R790, and opens its contacts 604 further to interrupt its own locking circuit. At its contacts 606, the relay R600 opens the path shunting the pulsing springs 632 of the pulse generating relay R630, thereby to condition the automatic pulse sender 15 to transmit the impulse or impulses of the first reset pulse train or digit to the pulsing relay R440 of the operated connector switch 13. At its contacts 608, the relay R600 completes the initially traced path for impressing ground potential upon the lead C674. At its contacts 602, the relay R600 disconnects the seventh marking lead from ground. At its contacts 601, the relay R600 reprepares the path for impressing ground potential upon the transfer lead C208. At its contacts 603, the relay R600 connects the control lead C217 to ground, thereby to complete the prepared operating circuit for the group marking relay R200. More specifically, this circuit extends from ground by way of the contacts 603 and 643, C217, the contacts 284, and the winding of R200 to battery.

In operating, the group marking relay R200 closes its contacts 201 to connect the grounded contact spring 118 of the line switch 11 to the tens marking lead C205 which designates the second group of ten floors. The marking of this lead with ground potential calls for a first digit "1" to be set up in the tens indicators of the selected display units. In this regard, it will be apparent that by properly connecting the tens marking leads terminating at the bank contacts of the different line switches, appropriate tens impulse digits, respectively designating the first digits of the floor numbers on which the corresponding control stations are located, may be set up in the pulse sender 15 for transmission to the tens indicators of any selected set display units. To amplify this statement, it will be noted that if the control network 16 and its associated selector switch 12 are seized through the bank contacts of the line switch individual to the thirty-fourth floor of the hospital, for example, the group marking relay R200, upon operating in the manner just explained, will close a ground path through the banks of the operated line switch and one of the ten sets of marking contacts controlled by the group marking relay R200 to the third marking lead extending to the contacts controlled by the counting relays of the network 31.

The group marking relay R200, upon operating, also closes its contacts 202 to complete an obvious alternative path for impressing ground potential upon the hold lead C215, whereby the hold relay R680 is again energized. This relay, in reoperating, closes its contacts 681 to recomplete the operating circuit for the start sending relay R660. The start sending relay, upon reoperating, initiates the operation of the pulse sender 15 to transmit the impulse or impulses of the first reset pulse train to the pulsing relay R440 of the operated connector switch 13. In the present case, wherein the calling control station A is located on the nineteenth floor, and hence the number "19" is to be set up in the selected indicators, the first reset pulse train comprises only a single impulse. The manner in which the pulse sender 15 functions to transmit this impulse is exactly the same as described above and will be clearly apparent from the preceding description. When the relay R710 operates to count the single impulse of the first reset pulse digit, it closes a circuit including the above-described marking path for energizing the stop relay R780. In the present case this circuit extends from ground by way of the contact spring 118, the tens marking lead C133, the contacts 201, C205, the contacts 711 and 771, and the winding of R780 to battery. The relay R780, upon reoperating, recompletes the operating circuit for the relay R790, and closes its contacts 781 to again connect the transfer lead C208 to ground. From this point on the manner in which the relays of the pulse sender 15 operate to measure a spacing interval between the two reset pulse digits, is exactly the same as described above. In this regard it will be recalled that the three relays R790, R600 and R610 remain operated throughout the spacing interval, and restore at the end of this interval. When the transfer lead C208 is connected to ground at the beginning of this spacing interval, the relay R290 of the control network 16 is energized over an obvious circuit. In operating, this relay locks to ground over a path including the contacts 291, the winding of R295, C209, the upper winding of R640 and the contacts 651. It will be noted that when this locking circuit is completed the series-connected windings of the two relays R295 and R640 are short-circuited. At its contacts 292, the relay R290 prepares multiple locking circuits for the two relays R230 and R240.

As pointed out previously, during the initial portion of each spacing interval the relay R780 restores and the relay R600 operates. Incident to these relay operations, ground potential is removed from the transfer lead C208. When this conductor is disconnected from ground the path short-circuiting the series-connected windings of the two relays R295 and R640 is opened, permitting these two relays and the relay R290 to be energized in series. The current traversing this series energizing circuit is sufficient to maintain the relay R290 in its operated position and to cause the operation of the two relays R295 and R640. The relay R295, upon operating, opens its contacts 296 to interrupt the operating circuit for the relay R290, and closes its contacts 297 to prepare the operating circuit for the unit marking relay R210. At its contacts 298, the relay R295 closes another point in the incomplete operating circuit for the release relay R240.

When the relay R600 operates during the initial portion of the spacing interval between the first and second reset pulse digits, it opens its contacts 603 to disconnect the control lead C217 from ground and thus deenergize the group marking relay R200. The latter relay, upon restoring, opens its contacts 202 to deenergize the hold relay R680. At its contacts 291, the relay R200 disconnects the marking lead C205 from ground, thereby further to interrupt the operating circuit for the stop relay R780. Following the release of the group marking relay R200 no further operation of the control network 16 occurs until the spacing interval between the two reset pulse digits is ended.

When its upper winding is energized in series with the windings of the two relays R290 and R295, the relay R640 operates and locks to ground in a circuit including its lower winding, the preliminary make contacts 646 and the contacts 651. After this locking circuit is completed, the relay R640 closes its contacts 645 to short-circuit its upper winding, thereby to increase the energization of the two relays R290 and R295. At its contacts 641, the relay R640 opens the above-traced path for impressing ground potential upon the transfer lead C208. At its contacts 643, the relay R640 opens a point in the above-traced path for impressing ground potential upon the control lead C217, thereby further to interrupt the operating circuit for the group marking relay R200. At its contacts 644, the relay R640 prepares a path for impressing ground potential upon the control lead C260, this path being presently held open at the contacts 603 of the operated relay R600.

When the single pulse constituting the first reset pulse digit is transmitted to the pulsing relay R440 through operation of the pulse generating relay R630, the pulsing relay R440 restores to complete the operating circuits for the operating magnets of the tens indicators in the selected display units. The circuit for energizing the magnet 501a of the indicator 500a may be traced as extending from ground by way of the contacts 453 and 462, the wiper 473, C515, the contacts 503a, the winding of the magnet 501a, C514, the wiper 472, the contacts 451 and 442, and the resistor 445 to battery. Branches of this circuit extend through the windings of the operating magnets embodied in the other indicators of the selected display units. When energized over these circuits, the magnets of the selected tens indicators function to advance their respectively associated display drums to the first off-normal positions thereof. Incident to the off-normal movement of the display drum embodied in the indicator 500a, the cam 504a is rotated to disengage the contact springs 503a and to close the contact springs 502a. Similar operations occur in each of the other selected tens indicators. At the contact springs 502a an alternative circuit is prepared for energizing the magnet 501a. In the present case, this alternative circuit is not used. In those instances, however, wherein the first reset pulse train comprises more than a single impulse, the alternative circuit just described is utilized; this alternative circuit extending from ground by way of the contact springs 502a, the winding of the magnet 501a, C514, the wiper 472, the contacts 451 and 442, and the resistor 445 to battery.

It will be understood from the foregoing explanation that after the pulsing relay R440 operates to transmit the single impulse of the first reset pulse digit to the tens indicators of the selected display units, these indicators are reset to display the numeral "1." Incident to the release of the relay R440 to transmit this impulse, the contacts 443 are closed to cause the reoperation of the two relays R430 and R435. Shortly after the open-circuit period of the pulse is ended, and during the inter-digit pause between this digit and the second reset pulse digit, the two relays R430 and R435 restore in sequence to transmit a current pulse to the magnet 484. As a result, the wiper 483 is stepped out of engagement with its associated fourth contacts and into engagement with its associated fifth contacts. With the wiper 483 in this position the relay R450 is deenergized, and an alternative circuit is prepared for the relay R460. In releasing, the relay R450 opens its contacts 451 to interrupt the common portion of the circuits for transmitting impulses to the tens indicators of the selected display units. At its contacts 453, the relay R450 opens a point in the common portion of the start circuits for the operating magnets of the tens indicators in the selected display units. At its contacts 452, the relay R450 prepares similar start circuits for transmitting a current pulse to the operating magnets of the units indicators in the selected display units. At its contacts 454, the relay R450 completes the prepared alternative operating circuit for the relay R460, this circuit extending from ground by way of the contacts 424, the wiper 483 and the engaged fifth contacts of the contact sets 481 and 482, the contacts 454, and the upper winding of R460 to battery. At its contacts 455, the relay R450 closes a point in the operating circuit for the release magnet 485. At its contacts 456, the relay R450 opens a point in the initially traced operating circuit for the timing relay R250.

The relay R460, upon operating, closes its contacts 463 further to prepare the above-mentioned start circuits for the units indicators of the selected display units. At its contacts 462, the relay R460 opens another point in the start circuits extending to the tens indicators of the selected display units. At its contacts 461, the relay R460 prepares the pulsing circuits to the units indicators of the selected display units. At its contacts 464, the relay R460 opens a point in the initially traced operating circuit for the transfer control relay R430. At its contacts 465, the relay R460 opens another point in the operating circuit for the release magnet 485. At its contacts 466, the relay R460 reprepares the previously traced operating circuit for the timing relay R250. Following the release of the transfer relay R450 and the operation of the transfer relay R460, the connector switch 13 is conditioned to respond to the impulses of the second reset pulse digit.

At the end of the spacing interval between the first and second reset pulse digits, the three relays R790, R600 and R610, as well as the pulse generating relays and the relays of the counting network 31, are all released in the manner previously explained. In releasing, the relay R790 opens its contacts 791 to deenergize the start sending relay R660, whereby further operation of the sender is prevented until the hold relay R680 is again energized. Incident to the release of the relay R600 a path including the contacts 603 and 644 is completed for impressing ground potential upon the control lead C216. When this lead is connected to ground a circuit including the contacts 237 is completed for energizing the unit marking relay R210. In operating, the relay R210 closes its contacts 211 to complete a path for impressing ground potential upon the ninth marking lead C203 extending to the contacts controlled by the counting relays of the network 31. More specifically, this path extends from ground by way of the contact spring 117, the unit marking conductor C132, and the contacts 211 to the ninth marking lead C203. In this regard, it will be understood that had the line switch 11 been provided to serve the control station located on the twenty-fifth floor of the hospital. For example, the unit marking lead C132 would have been connected through the contacts of the units marking relay R210 to the fifth marking lead extending to the contacts of thte counting relays in the network 31. More generally stated, the cross connection between the units marking conductor of each line switch and the contacts of the units marking relays in the various control networks determines, in each instance, the number of impulses of the second reset pulse digit which will be transmitted to the units indicators of a selected set of display units.

In operating, the relay R210 also closes its contacts 213 to complete the previously traced operating circuit for the hold relay R680. When the latter relay reoperates the operation of the automatic pulse sender 15 to transmit the nine impulses of the second reset pulse digit to the pulsing relay R440 of the operated connector switch 13 is initiated. The manner in which the transmission of this pulse train is effected will be clearly apparent from the preceding explanation. After the nine impulses have been counted through operation of the counting relays in the network 31, the relay R740 operates to complete a circuit including the above-described marking path for energizing the stop relay R730. More specifically, this circuit extends from ground by way of the contact spring 117, the unit marking conductor C132, the contacts 211, the ninth marking lead C203, the contacts 742 and 772, and the winding of R780 to battery. When the stop relay R730 operates, the automatic pulse sender 15 is conditioned to measure another spacing interval in the exact manner described above. During the initial portion of this interval, the relay R600 operates and opens its contacts 603 to interrupt the previously traced operating circuit for the unit marking relay R210. In restoring, the relay R210 opens its contacts 211 to disconnect the ninth marking lead C203 from ground, and opens its contacts 213 to deenergize the hold relay R680. The hold relay, upon restoring, opens its contacts 681 to interrupt the operating circuit for the start sending relay R660. With the last-mentioned circuit open, operation of the pulse sender 15 is arrested at the end of the measured spacing interval, in a manner clearly apparent from the foregoing explanation. It will be apparent, therefore, that after this interval is measured only the relays R640 and R650 are operated in the pulse sender.

The pulsing relay R440, in responding to the nine impulses of the second reset pulse digit, functions to repeat these pulses to the operating magnets of the units indicators in the selected display units. Thus each time this relay restores, a circuit is completed for energizing the magnet 501b of the indicator 500b. Initially this circuit extends from ground by way of the contacts 452 and 463, the wiper 473, C515, the contacts 503b, the winding of the magnet 501b, C513, the wiper 471, the contacts 461 and 441, and the resistor 444 to battery. When energized over this circuit, the magnet 501b operates to rotate its associated display drum one step, wherein the numeral "1" is displayed through the window of the indicator 500b. Incident to this off-normal movement of the display drum, the cam 504b is operated to disengage the contact springs 503 and to move the contact springs 502b into engagement. It will be understood, therefore, that the second to ninth current pulses of the second reset pulse digit are transmitted to the magnet 501b over a circuit which extends from ground by way of the contacts 502b, the winding of the magnet 501b, C513, the wiper 471, the contacts 461 and 441, and the resistor 444 to battery. The nine current pulses are also transmitted to the operating magnets of the units indicators in the other selected display units. Accordingly, at the end of the second reset pulse digit, all of the units indicators in the selected display units are reset to display the numeral "9." Thus the number "19" is set up in the display units individual to the calling doctor No. 247, to indicate that this doctor may be located in the nineteenth zone or on the nineteenth floor of the hospital, as the case may be.

When the pulsing relay R440 restores at the beginning of the first impulse of the second reset pulse digit, it closes its contacts 443 to recomplete the operating circuit for the transfer control relay R430. The two relays R430 and R435 are thus caused to reoperate at the beginning of the second reset pulse digit, and remain operated until shortly after the digit is ended. Incident to the release of these two relays at the end of the digit, a current pulse is transmitted to the operating magnet 484 of the minor switch 480 in the manner previously explained. This magnet responds to the received current pulse by moving the wiper 483 out of engagement with its associated fifth contacts, and into engagement with its associated sixth contacts. Incident to this movement of the wiper 483, the transfer relay R430 is deenergized and restores. In releasing, the relay R460 opens its contacts 461 to interrupt the pulsing circuits to the units indicators of the selected display units. At its contacts 465, the relay R460 further prepares the operating circuit for the release magnet 485. The remaining contact switching operations of the relay R460 are of no effect at this time.

When the wiper 483 is moved to engage its associated sixth contacts, the prepared operating circuit for the release relay R240 is completed, this circuit extending from ground by way of the sixth contact of the contact set 482, the wiper 433, the sixth contact of the contact set 481, the contacts 436, C303, the wiper 363, the contacts 349, C218, the contacts 223 and 298, and the upper winding of R240 to battery. When energized in this circuit, the relay R240 locks to ground over a path including the contacts 245 and 254 and the parallel-connected contacts 268, 272 and 292. At its contacts 246, the relay R240 opens a point in the locking circuit for the release relay R230. At its contacts 243, the relay R240 opens another point in the operating circuit for the release relay R230. At its contacts 244, the relay R240 opens another point in the circuit for energizing the hold relay R680. At its contacts 242, the relay R240 disconnects the line lead C207 from ground, thereby to cause the deenergization and release of the line relay R410. At its contacts 241, the relay R240 disconnects the test conductor C135 from ground, thereby to cause the deenergization and release of the magnet 110.

When its upper winding is deenergized in the manner just explained, the magnet 110 releases its two armatures 111 and 112, whereby the operating plunger of the line switch 11 is restored to normal. Incident to the release of this plunger, the contact springs 117 to 120, inclusive, are disengaged from the contacts terminating the conductors C132, C133, C134 and C135 of the trunk extending to the control network 16 and the selector switch 12. Also incident to the release of the two armatures 111 and 112, the contacts 115 are disengaged, the contacts 114 are disengaged, and the contacts 113 are moved into engagement to reprepare the operating circuit for the line relay R100. When the contact spring 119 is moved to disengage the contact terminating the line conductor C134, the previously traced circuit for energizing the pilot lamp 105a in series with the upper winding of the line relay R220 is interrupted. The resulting deenergization of the pilot lamp 105a serves to inform the calling doctor that the indicators provided for his use have been reset to display the number identifying his location. Following the operations just described the line switch 11 is fully restored to normal.

When its operating circuit is interrupted at the contacts 242 in the manner explained above, the line relay R410 restores and opens its contacts 411 to deenergize the hold relay R420. At its contacts 412, the relay R410 recompletes the operating circuit for the transfer control relay R430. The two relays R430 and R435 accordingly reoperate to prepare the operating circuit for the magnet 484. After a short time interval the relay R420 restores and opens its contacts 421 to disconnect the test conductor C381 from ground, whereby the relays R400, R340 and R260 are deenergized and restore. When ground potential is removed from this conductor the connector switch 13 is marked as idle in the bank contacts of the selector switches having access thereto. At its contacts 422, the relay R420 opens another point in its own locking circuit. At its contacts 423, the relay R420 interrupts the operating circuit for the relay R430. At its contacts 424, the relay R420 opens the prepared operating circuit for the magnet 484. The relay R400, upon restoring, opens its contacts 402 further to interrupt its own locking circuit, and closes its contacts 403 to reprepare its operating circuit. At its contacts 404, the relay R400 short-circuits the resistor 407. At its contacts 405, the relay R400 opens another point in the operating circuit for the relay R430. At its contacts 406, the relay R430 interrupts the previously traced operating circuit for the release relay R240.

The hold relay R420, upon restoring, also closes its contacts 425 to complete the prepared operating circuit for the release magnet 485, this circuit extending from ground by way of the contacts 425, 455 and 465, the off-normal springs 486, and the winding of the magnet 485 to battery. When energized in this circuit, the magnet 485 attracts its associated holding pawl, permitting the spring-biased wiper 483 to be returned to normal in the usual manner. Incident to the return movement of this wiper, the off-normal springs 486 are disengaged to deenergize the magnet 485, and the off-normal springs 487 are moved into engagement to complete the prepared operating circuit for the release magnet 476. The latter circuit may now be traced as extending from ground by way of the contacts 425, the off-normal springs 478 and 487, and the winding of the magnet 476 to battery. When thus energized the magnet 476 attracts its associated holding pawl, permitting the wiper carriage structure of the connector switch 13 to be returned to rotary and vertical normal in the usual manner. Incident to the final movement of the wiper carriage structure towards its vertical normal position, the off-normal springs 478 are disengaged to deenergize the release magnet 476; and the off-normal springs 477 are moved into engagement to reprepare the operating circuit for the hold relay R420. While the Strowger switching mechanism of the connector switch 13 is being released in the manner just explained, the line switching relay R340 of the selector switch 12 restores and opens its contacts 341 to deenergize the pulsing relay R440. Thus all of the equipment embodied in the connector switch 13 is fully restored to normal and this switch is conditioned for further use.

The release of the selector switch 12 is effected in response to the restoration of the line switching relay R340. Thus when this relay restores, it closes its contacts 347 to complete the prepared operating circuit for the release magnet 366, this circuit extending from ground by way of the off-normal springs 369, the contacts 324 and 347, and the winding of the magnet 366 to battery. When energized in this circuit the magnet 366 attracts its associated holding pawl, permitting the wiper carriage structure of the selector switch 12 to be returned to rotary and vertical normal in the usual manner. Incident to the final movement of this structure towards its normal position, the vertical off-normal springs 369 are disengaged to deenergize the release magnet 366; the off-normal springs 367 are disengaged to open another point in the operating circuit for the trunk hunting relay R350; and the off-normal springs 368 are moved into engagement to reprepare the operating circuit for the transfer relay R330. Following the operations just described, the selector switch 12 is fully restored to normal.

As indicated above, when the hold relay R420 of the connector switch 13 restores, the conductor C206 is disconnected from ground to interrupt the locking circuit for the start sending relay R260. In releasing, the relay R260 opens its contacts 261 further to interrupt its own locking circuit, and closes its contacts 262 to reprepare the operating circuit for the line relay R220. At its contacts 266, the relay R260 interrupts the series locking circuit for the two relays R270 and R280. At its contacts 266, the relay R260 also interrupts the previously traced operating circuit for the start relay R650. At its contacts 267, the relay R260 opens another point in one of the previously traced operating circuits for the hold relay R680. At its contacts 268, the relay R260 opens one of the multiple locking circuits for the release relay R240. At its contacts 269, the relay R260 disconnects the timer start lead C226 from ground in the control network 16. From the above explanation it will be apparent that the three relays R270, R280 and R650 are deenergized and restored in response to the release of the start sending relay R260. The relay R650, upon restoring, opens its contacts 651 to interrupt the locking circuit for the relay R640 and to interrupt the established series holding circuits for the two relays R290 and R295. Following the release of the relay R640, the automatic pulse sender 15 is fully restored to normal.

The relay R290, upon restoring in response to the release of the start relay R650, opens its contacts 292 to interrupt the only remaining locking circuit for the release relay R240. When the relay R240 releases, the control network 16 is fuly restored to normal. Following the release of this network, all of the equipment utilized in resetting the indicators individual to the doctor No. 247 is fully restored to normal.

In the event an all-busy condition is encountered at any switching stage in setting up a control connection to a selected set of indicators in the manner explained above, the operated switches of the train may be released by operating the key 104a to its release position. In this regard, it is pointed out above that if all of the selectors accessible to the line switch 11 are busy at the time the calling doctor initiates the call at the station A, no circuit will be provided for energizing the pilot lamp 105a. The failure of this lamp to be energized serves to inform the calling doctor that a control connection to the desired indicators cannot be obtained, whereupon he may release the key 104a to cause the disengagement of the contact springs 109. In this case, only the line relay R100 is energized in response to the initiation of the call and this relay is deenergized incident to the release of the key 104a.

It is also pointed out above that, in the event all of the connector switches in the group selected through operation of the selector switch 12 are busy at the time the call is initiated, the energization of the pilot lamp 105a is intermittently changed to produce a flickering signal at the calling station A. When this condition prevails only the magnet 110 of the line switch 11, the line relay R220 of the control network 16, and the three relays R300, R310 and R320 of the selector switch 12 are energized. The receipt of the all-switch-busy signal serves to inform the calling doctor that the desired control connection can not be set up. In order to release the connection this doctor actuates the key 104a to its release position, wherein the contact springs 109 are disengaged and the contact springs 107 are moved into engagement. At the contact springs 107, an alternative circuit is completed for energizing the pilot lamp 105a, this circuit extending from ground by way of the pulsing springs 102a, the shunt springs 103a, the filament of the lamp 105a, the springs 107, the contacts 114 and the resistor 116 to battery. At the contact springs 108, the previously traced circuit for energizing the pilot lamp 105a in series with the line relay R310 of the selector switch 12 is opened. When thus deenergized the line relay R310 restores and opens its contacts 312 to interrupt the circuit for energizing the hold relay R320. The relay R320 releases after an interval and opens its contacts 321 to disconnect the conductor C206 from ground and thus cause the deenergization and release of the line relay R220 and the magnet 110. Following the release of the line relay R220 the control network 16 is fully restored to normal.

Upon restoring, the hold relay R220 also closes its contacts 324 to complete the previously traced operating circuit for the release magnet 366. When this magnet is energized the Strowger switching mechanism of the selector 12 is restored to normal in the manner previously described. During the movement of the wiper carriage structure toward its normal position, the off-normal springs 367 are opened further to interrupt the operating circuit for the trunk hunting relay R350; the off-normal springs 369 are disengaged to deenergize the release magnet 366; the off-normal springs 368 are moved into engagement to reprepare the operating circuit for the transfer relay R330; the cam springs 304 are moved into engagement to reprepare the operating circuit for the line switching relay R340; and the cam springs 303 are disengaged to interrupt the circuit for energizing the busy signaling relay R300. Thus the selector switch 12 is fully restored to normal. When the magnet 110 is deenergized and restores, the line switch 11 is released in the manner previously explained. Incident to the release of this switch, the contacts 114 are disengaged to open the above-traced alternative circuit for energizing the pilot lamp 105a. The deenergization of this lamp serves to inform the calling doctor that the operated switches have been released, whereupon he may restore the key 104a to its normal position. Following the release of this key all of the apparatus utilized in setting up the incomplete connection is fully restored to normal.

In the event a connection is successfully routed to a desired set of indicators and the calling doctor, upon dialing the last digit, discovers that he has inadvertently dialed a number designating the wrong set of indicators, he may release the control connection during the timing interval measured by the operation of the relay R250. In this regard, it will be recalled that when the desired set of indicators is selected, a distinctive signal is produced at the calling station A to indicate that the selection has been successfully completed. In this case, when the key 104a is operated to its release position to cause the disengagement of the contact springs 108, the circuit for energizing the line relay R410 in series with the pilot lamp 105a is interrupted. In releasing, the line relay R410 opens its contacts 411 to deenergize the hold relay R420. The hold relay R420, upon restoring, initiates the release of the selector switch 12 and the connector switch 13, in the exact manner described above. In this regard it will be noted that the two transfer relays R450 and R460 are deenergized and restore immediately the hold relay R420 is released. One of the functions resulting from the release of the hold relay R420 is that of disconnecting the connected control or test conductors C381, C206 and C135 from ground, thereby to deenergize the line relay R220 of the control network 16 and the magnet 110 of the line switch 11. When these two control elements restore, the control network 16 and the line switch 11 are fully released. Here again the above-traced alternative circuit for energizing the pilot lamp 105a is deenergized in response to the release of the line switch 11, whereby the doctor using the control station A is signaled that the key 104a may be released.

From the above explanation, it will be apparent that as the doctor having the "in" identification No. 247, or any other doctor, proceeds from floor to floor of the hospital he may, by repeatedly dialing his "in" identification number at a control station on each floor, reset the display units assigned for his use to display numbers which accurately indicate his location. If a doctor leaves the hospital, or proceeds to a ward or floor where he will be occupied with duties from which he does not wish to be disturbed, he may wipe out the indications displayed by the display units provided for his use, without resetting these units to provide a new floor indication. To this end, the doctor having the "in" identification number 247 may dial his "out" identification number 147 at any one of the control stations provided in the hospital. Assuming that this number is dialed at the control station A, for example, and that the selector and connector switches 12 and 13 are utilized in selecting the display unit 26 and the corresponding display units of the other boards, the wipers of the selector switch 12 are positioned opposite the first level of contacts in the associated contact bank at the end of the first digit. Thus the trunk 18 is seized through the contacts of an odd-numbered contact level. Incident to the vertical movement of the wipers 360 to 363, inclusive, to a position opposite the first level of contacts in the associated contact field, the normal post springs 305 are closed. These normal post springs remain closed until the selector switch 12 is released. With the contact springs 305 in engagement, a circuit controlled by the digit transfer relay R280 is prepared for energizing the release relay R240 after the ten restoring pulses of the restoring pulse train are transmitted to the indicators 506a, 506b, etc., of the selected display units. The manner in which the automatic pulse sender 15 is controlled to transmit the ten restoring pulses to the pulsing relay R440, and these pulses are repeated to the operating magnets of the selected indicators, is exactly the same as described above with reference to the resetting of the indicators to display new indications. From this explanation, it will be recalled that during the spacing interval which follows the transmission of the restoring pulse train, the wiper 483 of the minor switch 480 is advanced to engage its associated fourth contacts, whereby the transfer relay R460 is deenergized. It will also be recalled from this explanation that during the first spacing interval, a ground pulse is transmitted by the pulse sender 15 over the transfer lead C208 to cause the operation of the two digit transfer relays R270 and R280. In this case, the relay R280, upon operating, closes its contacts 285 to complete the prepared alternative operating circuit for the release relay R240, this circuit extending from ground by way of the normal post springs 305, C219, the contacts 285, and the upper winding of R240 to battery. In operating, the relay R240 locks to ground over a path including the contacts 245 and 254, and the parallel-connected contacts 268 and 272. The relay R240, in operating, also initiates the release of the operated switch train and the pulse sender 15. The manner in which the release of the operated equipment is accomplished is substantially the same as described above with reference to the resetting of a selected set of indicators and will be clearly apparent from this explanation.

As pointed out in the introductory portion of the specification, provisions are made in the system for forcibly releasing any portion of the automatic switching equipment which may be held from one of the control stations for an unreasonable period of time. The holding of the automatic switching equipment may result from a defect in one of the automatic pulse senders, a defect in one of the automatic switches, or a failure of a calling doctor to complete the dialing of his identification number after the dialing operation has been started. Thus if the above described connection utilizing the line switch 11, the selector switch 12 and the connector switch 13 is again considered, and it is assumed that the calling doctor after dialing the first two digits of his "in" or "out" identification number fails to dial the third digit, the operated switch train will be held in its partially operated condition since the connector switch 13 and the control network 16 are not fully conditioned to initiate the operation of the automatic pulse sender 15. The automatic or forcible release of such a connection is effected under the control of the timing device 17. More specifically, when the line relay R220 operates incident to the seizure of the selector switch 12, it closes its contacts 221 to prepare the operating circuit for the release relay R230, and closes its contacts 225 to impress ground potential upon the timer start lead C226. When the timer start lead is connected to ground, the operation of the timing device 17 is initiated. This device is so constructed and arranged that it alternately transmits ground pulses over the two pulsing leads C235 and C236 at spaced intervals. The spacing between the first pulse transmitted over the lead C235, following the operation of the line relay R220, and the transmission of a pulse over the lead C236, measures a time interval during which the indicators desired by the calling doctor must be selected. In this regard, it will be noted that the operating circuit for the release relay R230 extends from the pulsing lead C235 by way of the contacts 221, 243, 253 and 231, and the upper winding of R230 to battery. It will also be seen that if the dialing operation is completed before a ground pulse is transmitted over this circuit by the timing device 17, the timing relay R250 operates to open this circuit at the contacts 253. Thereafter, and when the start sending relay R260 operates to cause the release of the timing relay R250 and to initiate the operation of the automatic pulse sender 15, a second timing interval is started. In this case the operating circuit for the release relay R230 extends from the pulsing lead C235 by way of the contacts 265', 243, 253 and 231, and the upper winding of R230 to battery. When energized over either of the two circuits just traced, the relay R230 operates and locks to ground over a path including its preliminary make contacts 232, the contacts 246 and 254, and one of the two sets of contacts 224 and 268. After this locking circuit is completed, the relay R230 opens its contacts 231 to interrupt the one of the two operating circuits over which it was energized. At its contacts 233, the relay R230 prepares a circuit for energizing the release relay R240. If with the release relay R230 operated, the timing relay R250 is caused to operate due to the selection of a desired set of indicators, the locking circuit for the release relay R230 is opened at the contacts 254. The resulting restoration of the relay R230 prevents the connection from being prematurely released. If, however, the relay R250 does not operate, or the automatic pulse sender 15 fails to complete its operation before the expiration of the second measured time interval, in which latter case the relay R230 will also be operated, a ground pulse is transmitted by the timing device 17 over the pulsing lead C236 and through the contacts 233 and the lower winding of the release relay R240. When thus energized, the release relay R240 locks to ground over one of its previously traced locking circuits and initiates the release of the operated switching equipment, in a manner which will be clearly apparent from the preceding explanation. In this regard, it will be noted that if the call has progressed as far as the connector switch 13, the relay R240, upon operating, opens its contacts 242 to deenergize the line relay R410 of this connector switch, and in this way initiates the release of the connection. On the other hand, if the call has progressed only as far as the selector switch 12, the opening of the contacts 242 results in the deenergization and release of the line relay R310, which relay in restoring initiates the release of the partially established connection. During the release of the connection the relay R230 is deenergized and restores immediately the release relay R240 operates. The latter relay, on the other hand, is deenergized and restores when its locking circuit is opened at the contacts 224, 268, 272 or 292, as the case may be. Following the release of the relay R240 all of the equipment used in setting up the incomplete control connection is restored to normal.

Although the invention has been explained with reference to a system for indicating the location of doctors attached to the staff of a large hospital, it will be understood that the system may also be used in industrial and other organizations to indicate the location of other objects, both animate and inanimate, which may be located in zoned areas that are not necessarily different floors of a building. For example, the system may be utilized for indicating at one or more points, the different locations of the executives and department heads of a large industrial organization having buildings disposed at random within a confined area. As a further example, the system may be used to indicate the location of loaded inter-departmental trucks which are used in an industrial organization and are moved from place to place to meet production or other manufacturing requirements. In order generically to designate the persons or movable objects, the locations of which are to be indicated, such persons or objects have been termed "subjects" in certain parts of the following portions of the specification.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In a system for indicating the location of a plurality of subjects which may be located in different zones of a plural zone area, a display board including signal controlled indicating means individual to said subjects and each operative to indicate the zone in which the corresponding subject may be located, a plurality of control stations, an automatic signal sender common to said stations and operative to transmit to any selected indicating means different signals which respectively designate the different zones in which the corresponding subject may be located, automatic switching equipment controllable from any one of said stations to select the indicating means corresponding to one of said subjects, to render the selected indicating means controllable by said sender and to initiate the operation of said sender, and means individual to any calling one of said stations for causing said sender to transmit to the selected indicating means the signal which designates the zone in which said one subject may be located.

2. In a system for indicating the location of a plurality of subjects which may be located in different zones of a plural zone area, a display board including signal controlled indicating means individual to said subjects and each operative to indicate the zone in which the corresponding subject may be located, a plurality of control stations, an automatic signal sender common to said stations and operative to transmit to any selected indicating means different signals which respectively designate the different zones in which the corresponding subject may be located, marking paths over which said sender is selectively controlled from said stations to transmit said different signals, automatic switching equipment controllable from one of said stations to select the indicating means corresponding to one of said subjects, to render the selected indicating means controllable by said sender and to initiate the operation of said sender, and means individual to said one station for controlling said sender over certain of said paths so that the signal designating the zone in which said one subject may be located is transmitted to the selected indicating means.

3. In a system for indicating the location of a plurality of subjects which may be located in different zones of a plural zone area, a display board including signal controlled indicating means individual to said subjects and each operative to indicate the zone in which the corresponding subject may be located, a plurality of control stations arranged in groups, an automatic signal sender common to said stations and operative to transmit to any selected indicating means different signals which respectively designate the different zones in which the corresponding subject may be located, group and unit marking paths individual to said stations, automatic switching equipment controllable from one of said stations to select the indicating means corresponding to one of said subjects, to render the selected indicating means controllable by said sender and to initiate the operation of said sender, and means controlled over the group and unit marking paths individual to said one station for controlling said sender so that the signal designating the zone in which said one subject may be located is transmitted to the selected indicating means.

4. In a system for indicating the location of a plurality of subjects which may be located in different zones of a plural zone area, a display board including signal controlled indicating means individual to said subjects and each operative to indicate the zone in which the corresponding subject may be located, a plurality of control stations arranged in groups, an automatic signal sender common to said stations and operative to transmit to any selected indicating means different signals which respectively designate the different zones in which the corresponding subject may be located, automatic switches individual to said stations, group and unit marking paths individual to said stations and each controlled by the associated one of said automatic switches, means including one of said switches and additional automatic switching equipment controllable from the station corresponding to said one switch for selecting the indicating means corresponding to one of said subjects, for rendering the selected indicating means controllable by said sender and for initiating the operation of said sender, and means controlled over the group and unit marking paths individual to said one station for controlling said sender so that the signal designating the zone in which said one subject may be located is transmitted to the selected indicating means.

5. In a system for selectively controlling the plurality of indicators of a display board and which includes a control station and automatic switches which are arranged to provide tandem related switching stages and are directively controllable from said station to select and set up control connections to said indicators; means for automatically producing one signal indication at said station when a control connection is extended from said station to one of said switches, means for automatically producing a second and different signal indication at said station when said control connection is extended to one of said indicators, and means for automatically producing a third and different signal indication at said station in the event an all-switch-busy condition is present at one of said switching stages.

6. In a system for selectively controlling the plurality of indicators of a display board and which includes a control station and automatic switches which are arranged to provide tandem related switching stages and are directively controllable from said station to select and set up control connections to said indicators; a signal lamp at said station, means for automatically energizing said lamp when a control connection is extended from said station to one of said switches, means for automatically altering the energization of said lamp in one manner when said control connection is extended to one of said indicators, and means for automatically altering the energization of said lamp in a different manner in the event an all-switch-busy condition is present at one of said switching stages.

7. In a system for selectively controlling the plurality of indicators of a display board and which includes a control station and automatic switches which are arranged to provide tandem related switching stages and are directively controllable from said station to select and set up control connections to said indicators; signaling means at said station, and means for automatically controlling said signaling means to produce a predetermined signal indication in the event an all-switch-busy condition is encountered at one switching stage in extending a control connection from said station through said switches to one of said indicators.

8. In an indicating system, a display board including a plurality of signal controlled indicators, a sender for transmitting signals to said indicators in order to determine the indications displayed thereby, a control station, means including a plurality of tandem related automatic switches controllable from said station for selectively associating said indicators with said signal sender, timing means, and means controlled by said timing means for automatically releasing a train of said tandem related switches in the event one of said indicators is not operatively associated with said signal sender by said switch train within a predetermined time interval after the first switch of said train is seized from said control station.

9. In an indicating system, a display board including a plurality of signal controlled indicators, a sender for transmitting signals to said indicators in order to determine the indications displayed thereby, a control station, means including a plurality of tandem related automatic switches controllable from said station for selectively associating said indicators with said signal sender, timing means, means controlled by said timing means for automatically releasing a train of said tandem related switches a predetermined time interval after the first switch of the train is seized from said control station, and means operative to prevent the operation of said last-named means in the event said signal sender is operatively associated with one of said indicators within said predetermined time interval.

10. In an indicating system, a display board including a plurality of signal controlled indicators, a sender for transmitting signals to said indicators in order to determine the indications displayed thereby, a control station, means including a plurality of tandem related automatic switches controllable from said station for selectively associating said indicators with said signal sender, timing means, a timing device, means controlled by said timing device for initiating the operation of said sender to transmit a signal to one of said indicators selected through a train of said switches a predetermined time interval after said one indicator is selected, and means controlled by said timing means for automatically releasing said train of switches in the event said one indicator is not selected therethrough within a predetermined time interval after the first switch of said train is seized from said station or in the event the transmission of said signal to said one indicator is not completed within a predetermined time interval after the signal transmission is started.

11. In an indicating system, a display board including a plurality of signal controlled indicators, a sender for transmitting signals to said indicators in order to determine the indications displayed thereby, a control station, means including a plurality of tandem related automatic switches controllable from said station for selectively associating said indicators with said signal sender, timing means, a timing device, means controlled by said timing device for initiating the operation of said sender to transmit a signal to one of said indicators selected through a train of said switches a predetermined time interval after said one indicator is selected, apparatus controlled by said timing means for automatically releasing said switch train at the end of a measured time interval, means responsive to the seizure of the first switch of said switch train from said control station for conditioning said apparatus to release said switch train, means responsive to the selection of said one indicator through said switch train for rendering said apparatus inoperative to release said switch train, and means controlled by said timing device for again rendering said apparatus operative to release said switch train incident to the initiation of the operation of said signal sender.

12. In an indicating system, a display board including a plurality of signal controlled indicators, an automatic sender for transmitting signals to said indicators in order to determine the indications displayed thereby, a control station, means including automatic switching apparatus directively controllable from said station for selectively associating said indicators with said signal sender, a timing device included in said apparatus, means responsive to the selection of one of said indicators for control by said sender for initiating the operation of said timing device, and means controlled by said timing device for initiating the operation of said sender a predetermined time interval after said one indicator is selected.

13. In an indicating system, a display board including a plurality of signal controlled indicators, an automatic sender for transmitting signals to said indicators in order to determine the indications displayed thereby, a control station, means including a train of tandem related automatic switches controllable from said station for selecting and associating one of said indicators with said sender and for initiating the operation of said sender, and timing means controlled through said switch train from the last switch of the train for delaying the operation of said sender for a measured time interval which starts with the selection of one of said indicators.

14. In an indicating system, a display board including a plurality of signal controlled indicators, an automatic sender for transmitting signals to said indicators in order to determine the indications displayed thereby, a control station, means including a train of tandem related automatic switches controllable from said station for selecting and associating one of said indicators with said sender, a timing device, means controlled through said switch train from the last switch of the train and operative in response to the selection of said one indicator for initiating the operation of said timing device, and means controlled by said timing device for initiating the operation of said sender a predetermined time interval after said one indicator is selected.

VINCENT A. JOHNSON.